US007523259B2

(12) United States Patent
Pistoulet

(10) Patent No.: US 7,523,259 B2
(45) Date of Patent: Apr. 21, 2009

(54) ASYNCHRONOUS READ CACHE MEMORY AND DEVICE FOR CONTROLLING ACCESS TO A DATA MEMORY COMPRISING SUCH A CACHE MEMORY

(75) Inventor: Pierre Pistoulet, Puyricard (FR)

(73) Assignee: STMicroelectronics SA, Montrouge (FR)

( * ) Notice: Subject to any disclaimer, the term of this patent is extended or adjusted under 35 U.S.C. 154(b) by 332 days.

(21) Appl. No.: 10/926,778

(22) Filed: Aug. 26, 2004

(65) Prior Publication Data
US 2005/0060495 A1 Mar. 17, 2005

(30) Foreign Application Priority Data
Aug. 27, 2003 (FR) ................................. 03 10212

(51) Int. Cl.
*G66F 13/18* (2006.01)
(52) U.S. Cl. ...................................................... 711/118
(58) Field of Classification Search .................. 711/203
See application file for complete search history.

(56) References Cited
U.S. PATENT DOCUMENTS

| 5,450,563 | A | | 9/1995 | Gregor | ...................... 395/403 |
|---|---|---|---|---|---|
| 5,668,972 | A | | 9/1997 | Liu et al. | ..................... 711/136 |
| 5,737,575 | A | | 4/1998 | Blaner | ........................ 395/491 |
| 5,752,260 | A | * | 5/1998 | Liu | ............................. 711/129 |
| 5,974,500 | A | | 10/1999 | Maletsky et al. | ............ 711/103 |
| 6,008,680 | A | * | 12/1999 | Kyles et al. | .................. 327/277 |
| 6,996,565 | B2 | * | 2/2006 | Skufca et al. | ................. 707/10 |
| 2001/0029572 | A1 | * | 10/2001 | Ooishi | ........................ 711/118 |
| 2004/0255145 | A1 | * | 12/2004 | Chow | ......................... 713/200 |
| 2005/0044317 | A1 | * | 2/2005 | Rivers | ......................... 711/118 |
| 2005/0083719 | A1 | * | 4/2005 | Kohno | ......................... 365/49 |

\* cited by examiner

*Primary Examiner*—Hyung S Sough
*Assistant Examiner*—Hamdy S Ahmed
(74) *Attorney, Agent, or Firm*—Lisa K. Jorgenson; Robert Iannucci; Seed IP Law Group PLLC

(57) ABSTRACT

A cache memory includes a memory array comprising logic latches, and a circuit for reading the cache memory arranged for receiving a reference tag at input, comparing tags present in the cache memory relative to the reference tag and, if a tag is identical to the reference tag, selecting the source datum associated with the identical tag. A device for controlling access to a data memory includes a storage unit that stores a plurality of attributes defining rights of access to the data memory, the cache memory, and a synchronous attribute search circuit, for searching for an attribute in the storage unit if the attribute is not in the cache memory.

29 Claims, 11 Drawing Sheets

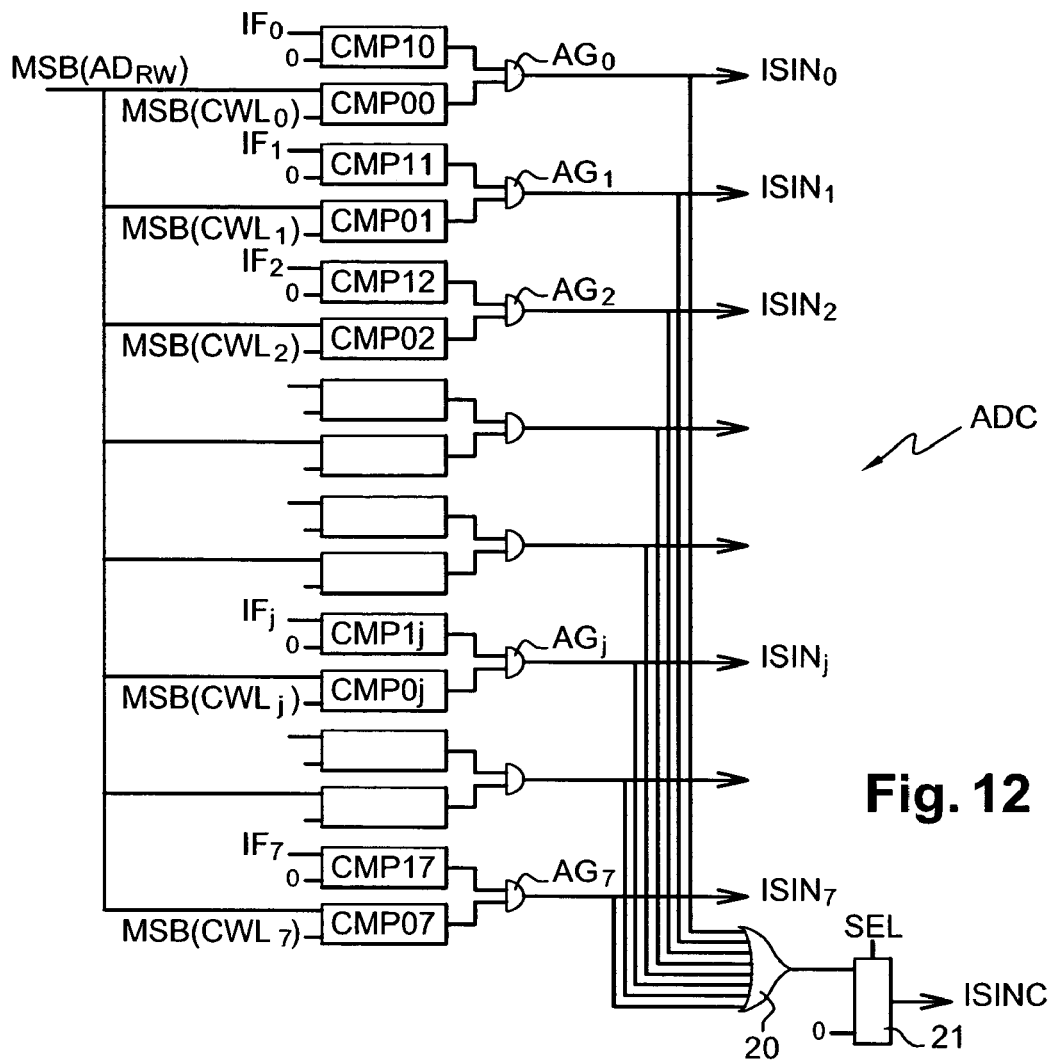
Fig. 12
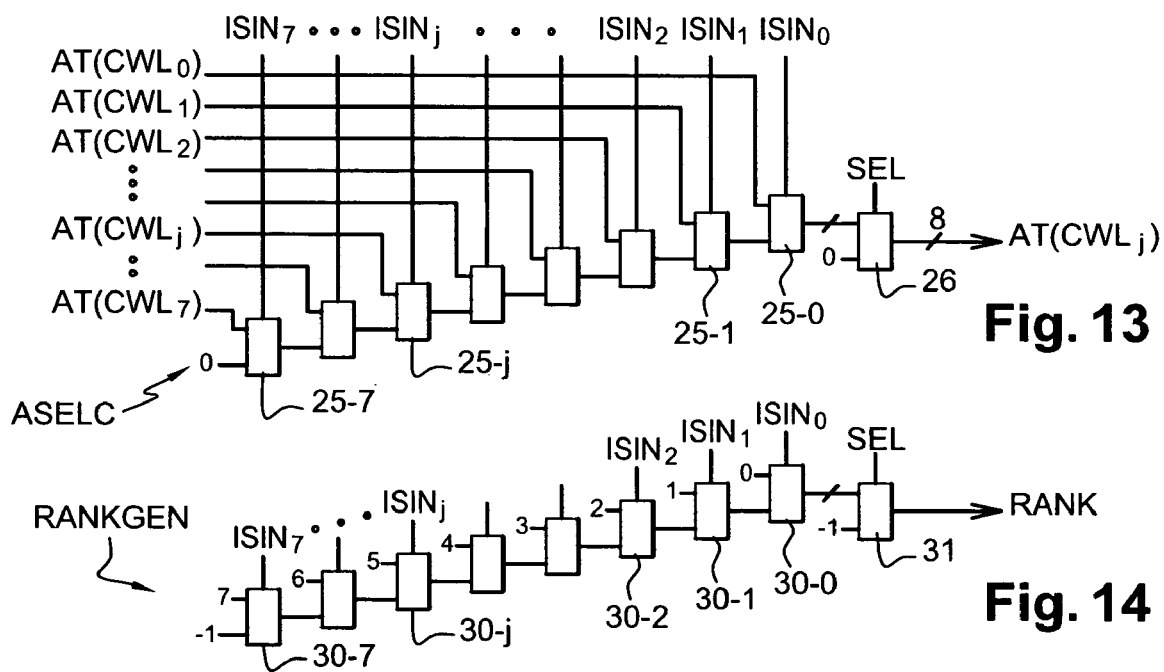
Fig. 13
Fig. 14

CK0=0↑1-ISINC=0

| CWL0 | 1 | MSB2 | AT2 |
|---|---|---|---|
| CWL1 | 1 | MSB1 | AT1 |
| CWL2 | 1 | MSB0 | AT0 |
| CWL3 | 0 | | |
| CWL4 | 0 | | |
| CWL5 | 0 | | |
| CWL6 | 0 | | |
| CWL7 | 0 | | |

Fig. 15A

CK0=0↑1-ISINC=0⇒1

| ⇒ CWL0 | 1 | MSB3 | AT3 |
|---|---|---|---|
| CWL1 | 1 | MSB2 | AT2 |
| CWL2 | 1 | MSB1 | AT1 |
| CWL3 | 1 | MSB0 | AT0 |
| CWL4 | 0 | | |
| CWL5 | 0 | | |
| CWL6 | 0 | | |
| CWL7 | 0 | | |

Fig. 15B

CK0=0↑1-ISINC=0⇒1

| CWL0 | 1 | MSB7 | AT7 |
|---|---|---|---|
| CWL1 | 1 | MSB6 | AT6 |
| CWL2 | 1 | MSB5 | AT5 |
| CWL3 | 1 | MSB4 | AT4 |
| CWL4 | 1 | MSB3 | AT3 |
| CWL5 | 1 | MSB2 | AT2 |
| CWL6 | 1 | MSB1 | AT1 |
| CWL7 | 1 | MSB0 | AT0 |

CK0=0↑1-ISINC=1

| CWL0 | 1 | MSB3 | AT3 |
|---|---|---|---|
| CWL1 | 1 | MSB7 | AT7 |
| CWL2 | 1 | MSB6 | AT6 |
| CWL3 | 1 | MSB5 | AT5 |
| CWL4 | 1 | MSB4 | AT4 |
| CWL5 | 1 | MSB2 | AT2 |
| CWL6 | 1 | MSB1 | AT1 |
| CWL7 | 1 | MSB0 | AT0 |

Fig. 16B

CK0=0↑1-ISINC=0

| CWL0 | 1 | MSB3 | AT3 |
|---|---|---|---|
| CWL1 | 1 | MSB7 | AT7 |
| CWL2 | 1 | MSB6 | AT6 |
| CWL3 | 1 | MSB5 | AT5 |
| CWL4 | 1 | MSB4 | AT4 |
| CWL5 | 1 | MSB2 | AT2 |
| CWL6 | 1 | MSB1 | AT1 |
| CWL7 | 1 | MSB0 | AT0 |

Fig. 17A

CK0=0↑1-ISINC=0⇒1

| CWL0 | 1 | MSB8 | AT8 |
|---|---|---|---|
| CWL1 | 1 | MSB3 | AT3 |
| CWL2 | 1 | MSB7 | AT7 |
| CWL3 | 1 | MSB6 | AT6 |
| CWL4 | 1 | MSB5 | AT5 |
| CWL5 | 1 | MSB4 | AT4 |
| CWL6 | 1 | MSB2 | AT2 |
| CWL7 | 1 | MSB1 | AT1 |

Fig. 17B

ASYNCHRONOUS READ CACHE MEMORY AND DEVICE FOR CONTROLLING ACCESS TO A DATA MEMORY COMPRISING SUCH A CACHE MEMORY

BACKGROUND OF THE INVENTION

1. Field of the Invention

The present invention relates to a method and a device for controlling access to a data memory, by using attributes defining authorizations to access secured memory areas of the data memory.

2. Description of the Related Art

In various applications, a data memory frequently contains elements access to which must be write, read or execution restricted (program code). Access to such a memory must therefore be controlled.

Such an access control is particularly provided in integrated circuits for smart cards the memories of which contain confidential information such as secrete codes, identification numbers, encryption keys . . . This information is read by a microprocessor when sessions are opened under the control of the operating system but cannot be read by a user program. This is therefore referred to as read-restricted access. Other types of data can be read by any type of program but cannot be re-written. This is therefore referred to as write-restricted access.

To ensure such an access control, the data are grouped together in the memory by type of authorized access (same authorization level) by placing them in a determined memory area with which information relating to the access authorizations granted to the memory area is associated. This information is coded in the form of a binary word called attribute. The total number of attributes varies according to the number of secured memory areas each having a particular authorization level.

FIG. 1 very schematically represents the architecture of a classical access control device implanted in an integrated circuit comprising a CPU (microprocessor central processing unit) and a data memory DMEM. The CPU and the memory are linked by a data bus DTB and an address bus ADB. The CPU sends read-access commands CMD (for a memory that can only be read) or read/write-access commands (for a memory that can be read and written) to the memory. The data memory is sectored, which means that it comprises areas each having a particular security level determined by an attribute. These areas are for example pages Pi (word lines) each comprising a plurality of binary words W0 to Wn.

The classical access control device mainly comprises a circuit MAC (memory access controller) and an attribute memory ATMEM containing a plurality of attributes ATi, each attribute corresponding to a secured memory area Pi of the data memory DMEM.

When the CPU sends a command CMD to the data memory DMEM, for example a read command, accompanied by the address ADrw of a binary word to be read in the data memory, the attribute memory ATMEM supplies to the circuit MAC, the attribute ATi corresponding to the page Pi in which the binary word must be read. The circuit MAC determines, according to-the nature of the command CMD and of the attribute, whether or not this access is authorized. The circuit MAC supplies for example an inhibiting signal in the shape of an interrupt signal IT. The signal IT is applied to an interrupt decoder ITDEC that supplies an interrupt vector ITV to the CPU.

Other information can be taken into account by the circuit MAC to determine the access authorizations, such as the operating mode of the CPU ("user" mode, "operating system" mode, "test" mode, etc.) for example.

Such an access control device has the advantage of being rapid and transparent to the CPU, since the attribute is read simultaneously with the access to the data memory, a barred access resulting in an interrupt signal being sent during the clock cycle during which the access to the memory is performed, or during the next clock cycle.

Such a device also has various disadvantages.

Firstly, the attribute memory ATMEM occupies a considerable surface area of silicon. This memory actually comprises a memory array of the same type as that of the data memory, for example an EEPROM or FLASH memory array (electrically erasable and programmable), a ROM memory array (read-only accessible) or RAM memory array (volatile memory array that is read and write accessible, and which must be initialized after each reset of the integrated circuit). The access to this memory array requires control circuits such as an address decoder, sense amplifiers, as well as a charge pump (for an electrically erasable and programmable memory array). Now, these various control circuits, and the memory array itself, are complex and cumbersome.

Secondly, simultaneously reading a datum in the memory DMEM and an attribute in the memory ATMEM leads to considerable peak power consumption, as a result of the simultaneous triggering of the sense amplifiers and the decoders of each memory.

Another classical embodiment of an access control device is schematically represented in FIG. 2. Here, the attributes are saved in the data memory itself, and are distributed among the various secured pages, i.e. with one attribute ATi per secured page Pi. When a binary word W0 to Wn is read in a page Pi, the corresponding attribute ATi, saved in the same page, is simultaneously read and is sent to the circuit MAC.

This solution avoids implanting a distinct attribute memory but requires producing a complex column decoder and adding specific sense amplifiers for the parallel reading of an attribute during the reading of a datum, such that the consumption peaks remain when all the sense amplifiers are triggered simultaneously.

BRIEF SUMMARY OF THE INVENTION

According to one embodiment, a high-speed read cache memory comprises: a memory array comprising word lines each provided for saving a datum comprising a source datum and a tag associated with the source datum; and a circuit for managing the cache memory, comprising a hard-wired logic asynchronous circuit for reading the cache memory, without address decoder, arranged for receiving a reference tag at input, for simultaneously comparing all the tags present in the cache memory relative to the reference tag and, if a tag is identical to the reference tag, selecting the source datum associated with the identical tag and supplying it to an output of the read circuit.

According to one embodiment, the circuit for managing the cache memory comprises a circuit for updating the cache memory arranged for managing the cache memory like a stack by saving data in the cache memory according to a determined order, so as to eject the oldest data from the cache memory, an old datum being a datum read in the memory prior to a more recent datum, a more recent datum being a datum read more recently than an older datum, a more recent datum possibly having been saved in the cache memory, prior to an older datum.

According to one embodiment, the circuit for updating the cache memory is arranged for saving a new datum at the top of the stack while shifting the data already present in the cache memory to the bottom of the stack and, if the stack is full, ejecting from the stack the datum that is at the bottom of the stack.

According to one embodiment, the circuit for updating the cache memory is also arranged for placing a datum-read in the cache memory at the top of the stack, and shifting the data already present in the cache memory to the bottom of the stack, and, if the stack is full, ejecting from the stack the datum that is at the bottom of the stack.

According to one embodiment, the asynchronous read circuit comprises a plurality of comparators for simultaneously comparing the tags that are in the cache memory relative to the reference tag, and a plurality of multiplexers for, if a tag is identical to the reference tag, selecting the source datum associated with the identical tag and supplying it to the output of the read circuit.

According to one embodiment, the cache memory comprises means of electrical connection to means for storing a plurality of attributes, each attribute being associated with a determined secured memory area of a data memory and defining authorizations to access the determined secured memory area, the connection means being arranged so that the cache memory saves attributes as source data, and secured memory area addresses associated with the attributes as tags associated with the source data.

According to one embodiment, the memory array comprises logic latches receiving a periodic refresh signal.

One embodiment of the present invention is directed to a device for controlling access to a data memory comprising secured memory areas, the memory receiving read or read/write-access commands. The device comprises: means for storing a plurality of attributes, each attribute being associated with a determined secured memory area of the memory and defining authorizations to access the determined secured memory area; means for, when an access command is sent to the data, memory, reading an, attribute corresponding to a secured memory area at which the access command is aimed; a cache memory for saving a determined number of attributes, the cache memory comprising: a memory array comprising word lines each provided for saving an attribute and a secured memory area address with which the attribute is associated, a circuit for managing the cache memory comprising an asynchronous circuit for searching for attributes in the cache memory without address decoding, arranged for, when an access command is sent to the data memory, searching in the cache memory for the attribute corresponding to the secured memory area at which the access command is aimed, and supplying the attribute if the latter is in there, and a synchronous attribute search circuit, for searching for an attribute in the storage means if the attribute is not in the cache memory.

According to one embodiment, the circuit for managing the cache memory is arranged for saving in the cache memory an attribute read in the storage means by the synchronous attribute search circuit.

According to one embodiment, the circuit for managing the cache memory saves in the cache memory, with each attribute, the address of a secured memory area of the data memory to which the attribute corresponds.

According to one embodiment, the asynchronous attribute search circuit supplies an attribute when the secured memory area address saved in the cache memory with the attribute corresponds to the address of the secured memory area at which the access command sent to the data memory is aimed.

According to one embodiment, the asynchronous attribute search circuit comprises a plurality of comparators for simultaneously comparing secured memory area addresses saved in the cache memory with the address of the secured memory area at which the access command sent to the data memory is aimed.

According to one embodiment, the memory array of the cache memory comprises a plurality of logic latches forming memory cells of the cache memory.

According to one embodiment, the cache memory is provided for saving a determined number of attributes that is lower than the number of attributes saved in the storage means, and the circuit for managing the cache memory comprises a circuit for updating the cache memory, to manage the cache memory like a stack by putting the last attribute read in the cache memory to the top of the stack and by shifting attributes-present in the stack to the bottom of the stack.

According to one embodiment, the circuit for updating the cache memory is arranged for saving, at the top of the stack, a new attribute read in the storage means by the synchronous attribute search circuit, and shifting the other attributes present in the stack to the bottom.

According to one embodiment, the storage means are formed by a dedicated area of the data memory, and the synchronous attribute search circuit is arranged for, when an access command is sent to the data memory: intercepting the access command if the attribute corresponding to the secured memory area at which the access command is aimed is not in the cache memory, reading in the dedicated area of the data memory the attribute corresponding to the secured memory area at which the intercepted access command is aimed then applying the access command to the data memory.

According to one embodiment, an access command comprises at least one access signal and one access address, and the synchronous attribute search circuit is arranged for, when the attribute corresponding to the secured memory area at which the access command is aimed is not in the cache memory: preventing the application of the access signal and the access address to the data memory, and applying to the data memory a read-access signal and an access address corresponding to the area dedicated to the attributes, such that the data memory supplies the attribute corresponding to the secured memory area at which the access command is aimed.

According to one embodiment, the synchronous attribute search circuit, the circuit for managing the cache memory and the data memory are synchronized by staggered clock signals.

According to one embodiment, the synchronous attribute search circuit is arranged for sending a wait signal to a unit sending the access command, while an attribute is being searched for in the data memory.

According to one embodiment, the sending unit is a microprocessor central processing unit, which is programmed to maintain an access command while the wait signal is present.

According to one embodiment, the device comprises a control circuit for supplying a signal for authorizing or refusing access to the data memory, according to the value of the attribute and to the nature of the access command sent to the data memory.

One embodiment of the present invention is directed to a method for controlling access to a data memory comprising secured memory areas and receiving read or read/write-access commands, by using a plurality of attributes saved in means for storing attributes, each attribute being associated with a determined secured memory area of the memory and defining authorizations to access the determined secured memory area. The method comprises a step of searching for an attribute when an access command is sent to the data memory, and providing a cache memory for saving a determined number of attributes that is lower than the number of attributes saved in the storage means. The attribute search step comprises: an asynchronous step of searching in the cache memory for the attribute corresponding to the secured memory area at which the access command is aimed, without using any address decoder, and of reading the attribute if the latter is in there, and a synchronous step of searching for the attribute in the storage means, if the attribute is not in the cache memory.

According to one embodiment, the method comprises saving in the cache memory an attribute not found in the cache memory and read in the storage means.

According to one embodiment, the method comprises saving in the cache memory, with each attribute, the address of a secured memory area of the data memory to which the attribute corresponds.

According to one embodiment, the asynchronous step of searching for an attribute in the cache memory comprises a plurality of simultaneous comparisons between secured memory area addresses saved in the cache memory and the address of the secured memory area at which the access command sent to the data memory is aimed.

According to one embodiment, the method comprises a step of updating the cache memory, to manage the cache memory like a stack by putting the last attribute read in the cache memory to the top of the stack, and by shifting attributes present in the stack to the bottom of the stack.

According to one embodiment, the step of updating the cache memory comprises a step of saving a new attribute read in the storage means at the top of the stack, by shifting the other attributes present in the stack to the bottom of the stack.

According to one embodiment, the storage means are formed by a dedicated area of the data memory, and the synchronous attribute search step comprises the steps of: intercepting the access command if the attribute corresponding to the secured memory area at which the access command is aimed is not in the cache memory, reading in the dedicated area of the data memory the attribute corresponding to the secured memory area at which the intercepted access command is aimed, then applying the access command to the data memory.

According to one embodiment, an access command comprises at least one access signal and one access address, and the synchronous attribute search step comprises the steps of: preventing the application of the access signal and the access address to the data memory, and applying to the data memory a read-access signal and an access address corresponding to the area dedicated to the attributes, such that the data memory supplies the attribute corresponding to the secured memory area at which the access command is aimed.

According to one embodiment, the method comprises the following steps, performed in synchronization with three staggered clock signals: upon the appearance of a variation edge of a first clock signal, searching for an attribute in the cache memory, then: 1) if the attribute is found in the cache memory, applying the access command to the data memory upon the appearance of a variation edge of a second clock signal, 2) if the attribute is not found in the cache memory: applying a read address and a read signal to the data memory upon the appearance of the variation edge of the second clock signal, then, upon the appearance of a variation edge of a third clock signal, reading the attribute in the cache memory, then, upon the appearance of the next variation edge of the first clock signal, saving the attribute in the cache memory, then, upon the appearance of the next variation edge of the second clock signal, applying the access command to the data memory.

According to one embodiment, the method comprises sending a wait signal to a unit sending the access command, while an attribute is being searched for in the data memory.

According to one embodiment, the sending unit is a microprocessor central processing unit, which is programmed to maintain an access command while the wait signal is present.

According to one embodiment, the method comprises a control step for supplying a signal for authorizing or refusing access to the data memory, according to the value of the attribute and the nature of the access command sent to the data memory.

BRIEF DESCRIPTION OF THE SEVERAL VIEWS OF THE DRAWINGS

These and other features and advantages of the present invention will be explained in greater detail in the following description of one access control method according to the present invention and of three embodiments of an access control device according to the present invention, given in relation with, but not limited to the following figures:

FIG. 12 is the logic diagram of an attribute detection circuit present in the management circuit in FIG. 11, FIG. 13 is the logic diagram of an attribute selection circuit present in the management circuit in FIG. 11, FIG. 14 is the logic diagram of a rank generating circuit present in the management circuit in FIG. 11, FIGS. 15A, 15B, 16A, 16B, 17A, 17B show sequences of updating the cache memory.

DETAILED DESCRIPTION OF THE INVENTION

First Embodiment of an Access Control Device According to the Present Invention

Figure 1:
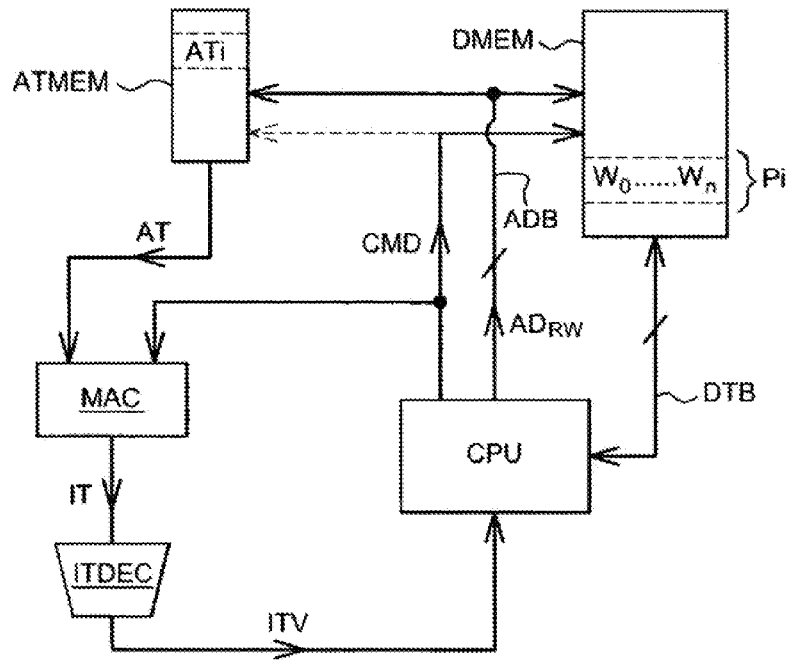
FIGS. 1 and 2 described above represent classical devices for controlling access to a data memory.
Figure 2:
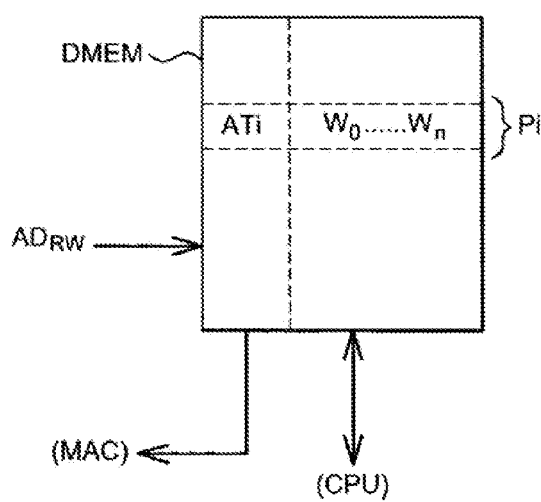
Figure 3:
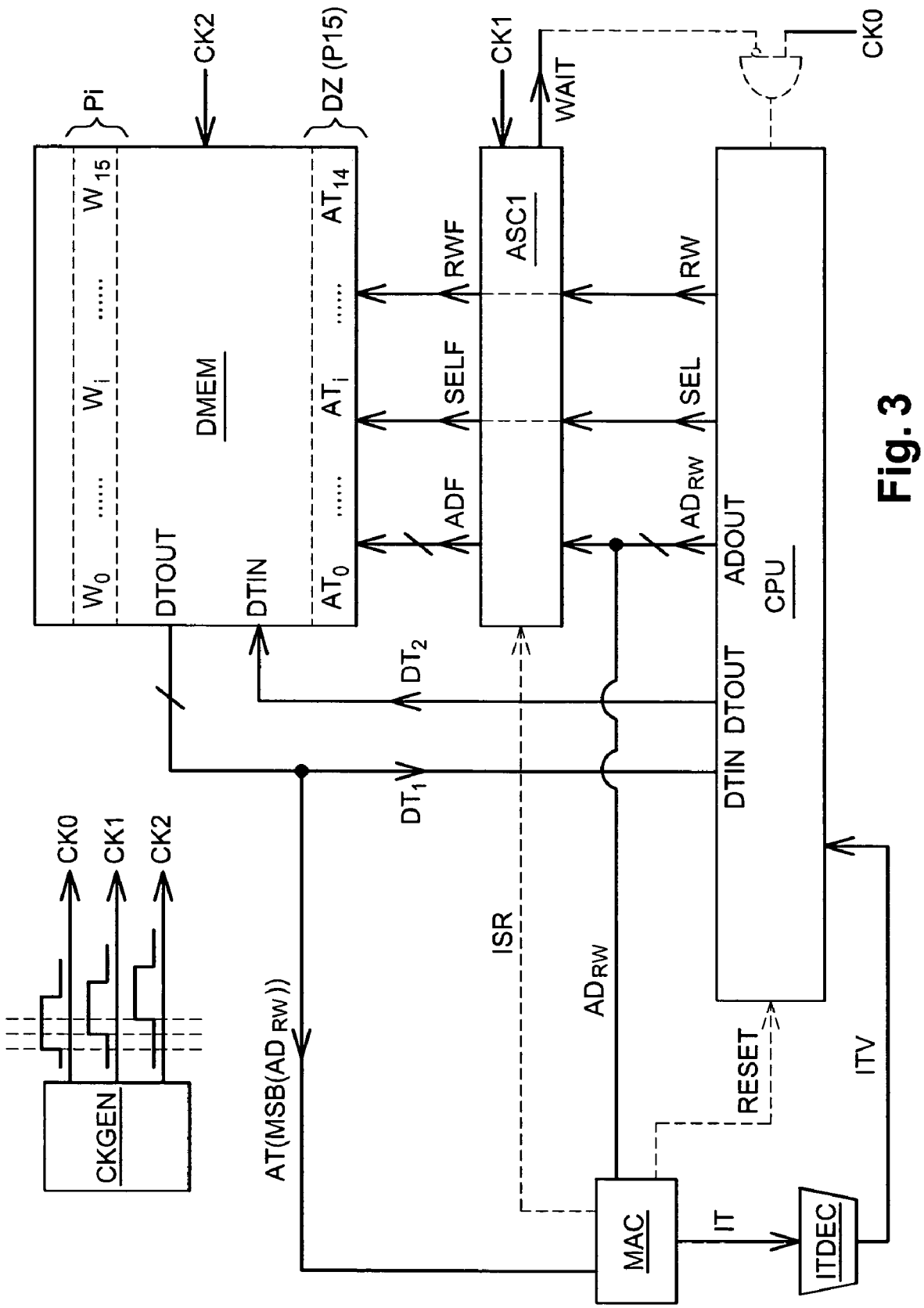
FIG. 3 represents a first embodiment of an access control device according to the present invention.

FIG. 3 represents in block form the architecture of a first embodiment of an access control device according to the present invention.

The access control device is here implemented in an integrated circuit comprising a CPU (microprocessor central processing unit) and a data memory DMEM. The CPU is clocked by a clock signal CK0 supplied by a clock signal generator CKGEN. It sends access commands to the memory DMEM that here comprise an address ADrw for reading/writing the memory DMEM, supplied by an output ADOUT of the CPU, a signal SEL for selecting the memory DMEM and a read/write signal RW. The signal RW is here equal to 1 for a read operation and to 0 for a write operation. The CPU also comprises an output DTOUT linked to an input DTIN of the memory DMEM, supplying data DT2, and the memory DMEM comprises an output DTOUT linked to an input DTIN of the CPU, supplying data DT1.

The access control device comprises a synchronous attribute search circuit ASC1 according to the present invention and a classical control circuit MAC, receiving an attribute AT when the CPU sends an access command to the data memory. When an access is not authorized, the circuit MAC supplies an inhibiting signal, such as an interrupt signal IT for example applied to an interrupt decoder ITDEC. The latter then supplies, to the CPU, an interrupt vector ITV (address of a sub-program for processing the inhibition or jump to an address comprising the address of a sub-program, which can be a software reset sub-program) and/or a hardware reset signal RESET.

According to a first aspect of the present invention, attributes allowing the rights of access to the secured pages of the memory to be defined are saved in a dedicated area DZ of the data memory DMEM.

Figure 4:
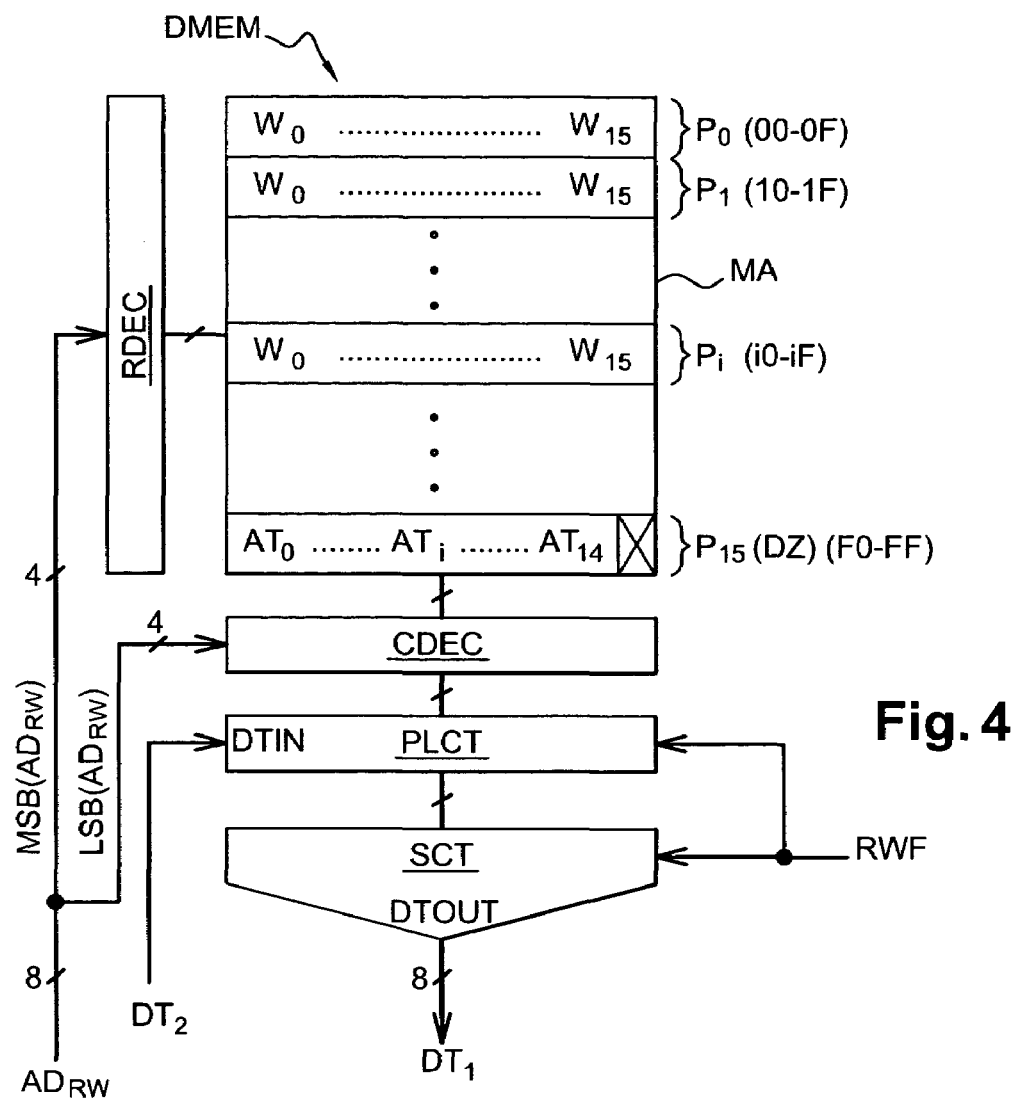
FIG. 4 represents the architecture of a data memory controlled by the access control device in FIG. 3.

FIG. 4 represents an example of an embodiment of the memory DMEM, in which the memory is addressed in 8 bits (address ADrw). The memory DMEM comprises a memory array MA, for example of Flash or EEPROM type (electrically erasable and programmable), a word line decoder RDEC, a column decoder CDEC, a read circuit SCT and a write circuit PLCT.

The decoder RDEC receives the 4 most significant bits MSB(ADrw) of the address ADrw, and the decoder CDEC receives the 4 least significant bits LSB(ADrw) of the address ADrw. The circuit PLCT comprises programming latches (not represented) and comprises an input forming the input DTIN of the memory, receiving the data DT2 supplied by the CPU. The circuit SCT comprises sense amplifiers (not represented) and an output forming the output DTOUT of the memory, supplying data DT1 read in the memory array MA. The circuits SCT and PLCT are linked to the memory array MA through the column decoder CDEC, and receive the read/write signal RW.

The memory array MA here comprises 16 pages P0 to P15 each having a determined security level. Each page can receive a plurality of binary words, for example 16 binary words W0 to W15 of 8 bits (bytes). The pages P0 to P14 receive working data (variables, mathematical keys, secret data, program codes . . . ) while the page P15 is reserved for storing attributes and forms the dedicated area DZ of the memory DMEM. As the page P15 has a capacity for saving 16 binary words, it can receive 15 attributes AT0 to AT14 of 8 bits each corresponding to one of the pages P0 to P14, supposing here that each of the pages requires access control. Thus, the bits MSB(ADrw) of the address ADrw form page addresses (word line addresses) while the bits LSB(ADrw) correspond to the addresses of the words in the pages (column addresses).

Preferably, the attributes are saved in respective columns of the page P15. Each column has a rank corresponding to the rank of the page to which the attribute stored in the column corresponds. Table 1 below describes the correspondence between the address ADrw of a binary word Wi and the address of the attribute corresponding to the page Pi in which the binary word is located. It can be seen that the 4 most significant bits of the address of the attribute are always equal to F (address of the page P15) while the 4 least significant bits of the attribute are equal to the 4 most significant bits of the address of the binary word considered, i.e. the address of the page Pi with which the attribute is associated.

TABLE 1

|  | Addresses* ADrw of the words W0 to W15 | Address* of the corresponding attribute |
|---|---|---|
| Page P0 | 00 to 0F | F0 |
| Page P1 | 10 to 1F | F1 |
| . . . | | |
| Page Pi (index "i") | i0 to iF | Fi |
| . . . | | |
| Page P14 | E0 to EF | FE |

*hexadecimal notation

According to a second aspect of the present embodiment arising again with reference to FIG. 3, the synchronous circuit ASC1 is inserted between the CPU and the inputs of the data memory. It filters the signals SEL, RW, and ADrw supplied by the CPU, and supplies, instead of these signals, the filtered signals described by table 2 below.

TABLE 2

| Signals sent by the CPU to the memory DMEM | Filtered signals supplied by the circuit ASC1 to the memory DMEM |
|---|---|
| SEL (active value: 1) | SELF (active value: 1) |
| RW (read: 1; write: 0) | RWF (read: 1; write: 0) |
| ADrw | ADF |

The circuit ASC1 also supplies a signal WAIT the active value of which is 1 for example. This signal is provided for freezing the signals SEL, RW and ADrw during an attribute search phase described below. Various technical measures can be taken for this purpose, for example, as represented by dotted lines in FIG. 4, applying the signal CK0 to the CPU through an AND gate, receiving the signal CK0 at a non-inverting input and the signal WAIT at an inverting input. The CPU is thus blocked when WAIT=1 and the signals SEL, RW and ADrw are frozen. However, a preferred alternative, which is more flexible in use and more advantageous, is to program the CPU so that it takes the signal WAIT into account, such that blocking the clock signal CK0 is then not necessary. In particular, the CPU can be programmed to consider that the combination of a rising edge of the signal CK0 and of the condition WAIT=1 forms a request asking it to identically reproduce the signals SEL, RW and ADrw. In this case, the CPU continues to receive the signal CK0 and is able to process an interrupt signal IT sent by the circuit MAC while the signal WAIT is on 1.

The circuit ASC1 is a state machine having three internal states. The value of the filtered signals and of the signal WAIT varies according to the internal state of the circuit ASC1, as described by table 3 below. The state IDL ("Idle") is an idle state in which the filtered selection signal SELF is maintained at a value of non-selection of the memory DMEM, here 0. The state ASEARCH ("Attribute Search") is an active attribute search state, in which the signal WAIT is on 1. The state AMA ("Authorized Memory Access") is a transparent state in relation to the commands sent by the CPU, in which the address ADF copies the address ADrw, the signals RWF, SELF copy the signals RW, SEL, and the signal WAIT is on 0.

TABLE 3

| Internal state | Values of the filtered signals |
| --- | --- |
| IDL | SELF = 0 |
|  | RWF = #(*) |
|  | ADF = #(*) |
|  | WAIT = 0 |
| ASEARCH | SELF = 1 |
|  | RWF = 1 (read) |
|  | ADF = F //MSB(ADrw)(**) |
|  | WAIT = 1 |
| AMA | SELF = 1 |
|  | RWF = RW (read or write) |
|  | ADF = ADrw |
|  | WAIT = 0 |

(*)Default value, without importance since SEL = 0
(**)Address of an attribute, as described below In order to synchronize the CPU, the circuit ASC1 and the memory DMEM, the clock signal generator CKGEN supplies two other clock signals CK1, CK2 of the same period T as the signal CK0 but having substantially staggered variation edges. Thus, the signal CK1 has a delay dT relative to the signal CK0 and the signal CK2 has the delay dT relative to the signal CK1, the sum of the delays (2dT) being chosen-so that the following relation is verified:

$$Tacc < T - 2dT$$

Tacc being the time to access the data memory, i.e. the time the memory takes to execute a read or write-access command.

The circuit ASC1 is clocked by the signal CK1 and the memory DMEM is clocked by the signal CK2. It is assumed below that the CPU, the circuit ASC1 and the memory DMEM are sensitive to the rising edges of these various clock signals.

The performance of a read operation in the memory DMEM comprises the following steps:

First Clock Cycle

Upon the appearance of the rising edge of the signal CK0, the CPU sets the signal SEL to 1 (selecting the memory DMEM), sets the signal RW to 1 (reading the memory) and supplies an address ADrw for reading a word Wi. These different signals are blocked by the circuit ASC1 that is in the state IDL by default.

Upon the appearance of the rising edge of the signal CK1, the value on 1 of the selection signal SEL causes the circuit ASC1 to switch into the state ASEARCH. The circuit ASC1 sets the signal SELF to 1, sets the signal RWF to 1 and supplies an address ADF to the memory DMEM. This address ADF is the address of the attribute that is associated with the secured memory area designated by the address ADrw, i.e.:

$$ADF = F//MSB(ADrw)$$

"F" being the address of the area dedicated to the attributes (page P15 of the memory); "//" the symbol of the concatenation, MSB(ADrw) the address of the page at which the command to access the word Wi (Cf. Table 1) is aimed.

The circuit ASC1 also-sets the signal WAIT to 1, so that the signals SEL, RW, ADrw are frozen at the next clock cycle.

Upon the appearance of the rising edge of the signal CK2, the memory DMEM is read activated and supplies the attribute sought AT(MSB(ADrw)) to the circuit MAC, after the access time Tacc has elapsed. The circuit MAC also receives the address ADrw and is able to supply the inhibiting signal IT, here an interrupt signal, if the datum at which the address ADrw is aimed is not read accessible.

Second Clock Cycle

Upon the appearance of the next rising edge of the signal CK0, two situations can be encountered depending on whether the circuit MAC has supplied the interrupt signal during the previous clock cycle or not.

In the first case the microprocessor switches into an interrupt sub-program and releases the signals SEL, RW and ADrw despite the fact that the signal WAIT is on 1, such that the access to the data memory is neutralized. For example, the CPU positions its program counter at a program address located in a program memory (not represented in the Figures) in which a high priority interrupt management sub-program resides, which causes a software reset of the CPU. As another solution, the hardware reset signal RESET can be directly applied to the CPU by the circuit MAC.

In the second case, no interrupt signal is sent and the microprocessor maintains the signals SEL, RW and ADrw since the signal WAIT is on 1.

Upon the appearance of the next rising edge of the signal CK1, the circuit ASC1 then switches into the state AMA such that the signal ADF copies the address ADrw, the signals RWF, SELF copy the signals RW, SEL and the signal WAIT is set back to 0.

Upon the appearance of the next rising edge of the signal CK2, the memory DMEM is then read activated and supplies the word Wi at which the address ADrw is aimed, after the access time Tacc has elapsed.

Third Clock Cycle

Upon the appearance of the next rising edge of the signal CK0, the CPU can use this datum, unless it has been sent in an interrupt sub-program during the previous cycle.

Upon the appearance of the next rising edge of the signal CK1, the circuit ASC1 returns to the state IDL.

An operation of writing the memory comprises similar steps, and only differs from the read operation by the fact that the CPU applies a datum DT2 to the input DTIN of the memory and takes the signal RW to 0 instead of 1. If, at the end of the cycle of searching for the attribute (first clock cycle, circuit ASC1 in the state ASEARCH), it arises that the datum supplied must not be written in-the data memory, the writing of the datum is prevented as above, which causes the release of the signals SEL, RW, ADrw at the beginning of the second clock cycle, before the memory has the time to save the datum.

An alternative to this hardware blocking means that is classical per se involves having an additional inhibiting signal ISR ("Idle State Requested") sent by the circuit MAC, which is applied to the circuit ASC1 and forces the latter to come back to the state IDL, instead of switching into the state AMA. Therefore, the circuit ASC1 bars the access to the memory DMEM and the CPU cannot access it. This type of blocking according to the present invention can be combined with an interrupt blocking of the type described above. This type of blocking is also applicable when the unit that is requesting access to the data memory is not a programmable circuit, or cannot receive an interrupt signal (for example a remote CPU requesting access to the memory through external connection terminals).

Various other means for preventing the performance of an inhibited operation can be provided by those skilled in the art.

In summary, the storage of attributes according to the method of the present invention only requires reserving a memory area in the data memory, or providing an additional memory area in the data memory (with constant data storage capacity). The surface area of silicon occupied by the device is clearly reduced since it is no longer necessary to provide an attribute memory complete with decoders and sense amplifiers.

Furthermore, the attributes and the data are read at different instants, such that the peak power consumption is clearly reduced.

The opposing aspect of the embodiment that has just been described is that the access time to the data is slowed down by the addition of the step of searching for the attribute in the data memory, which takes up one clock cycle.

Although the loss of a clock cycle only represents, relatively speaking, a slight slowdown in the operation of the CPU (the subsequent operations of processing a datum read in the memory possibly representing several clock cycles), an objective of the present invention is here to optimize the time for searching for the attribute without excessively penalizing the device in terms of encumbrance.

Second Embodiment of an Access Control Device According to the Present Invention General Principles The present invention is here based on the observation according to which, when the CPU successively performs several accesses to the data memory, the successive accesses generally concern the same memory area and therefore involve the same attribute.

Thus, one idea of the present invention is to store at least the last attribute read in the data memory in a cache memory and, when a new access command is sent by the CPU, to search for the corresponding attribute in the cache memory before searching for it in the data memory.

As above, and out of concern to simplify the present description, "search" means an operation including reading the element sought if the latter is found (which is always the case in the data memory, but is not necessarily the case in the cache memory).

Such a cache memory can therefore store at least one attribute, and generally speaking store a number of attributes lower than the number of attributes present in the data memory, and occupies a surface area of silicon lower than a classical attribute memory.

For such a cache memory to save on the clock cycle required to search for the attribute in the data memory, the search for the attribute in the cache memory must be rapid. According to one embodiment of the present invention, this search is performed asynchronously between the moment at which the rising edge of the signal CK0 appears, i.e. the instant at which the CPU supplies an access command, and the moment at which the rising edge of the signal CK1 appears, i.e. the instant at which the circuit ASC1 switches into the state ASEARCH. Thus, if the attribute is found in the cache memory before the appearance of the rising edge of the signal CK1, it is not necessary for the circuit ASC1 to switch into the state ASEARCH. The circuit ASC1 can directly switch into the transparent state AMA.

For this purpose, the embodiment proposes providing a cache memory unequipped with classical decoding circuits using-which a rapid asynchronous reading of the cache memory is not possible. Such a cache memory comprises for example memory points produced using logic latches (Flip-Flops, D latches, . . . ), and the search for an attribute in the cache memory is performed by a hard-wired asynchronous circuit.

Yet another idea of the present invention whereby the cache memory can be rapidly read without address decoding, is to save with each attribute the address of the secured memory area with which the attribute is associated. Thus, the search for an attribute is performed by determining whether the address of the secured memory area at which an access command is aimed is in the cache memory, and the attribute is read by selecting the attribute associated with the address of the secured memory area.

EXAMPLE OF EMBODIMENT

Figure 5:
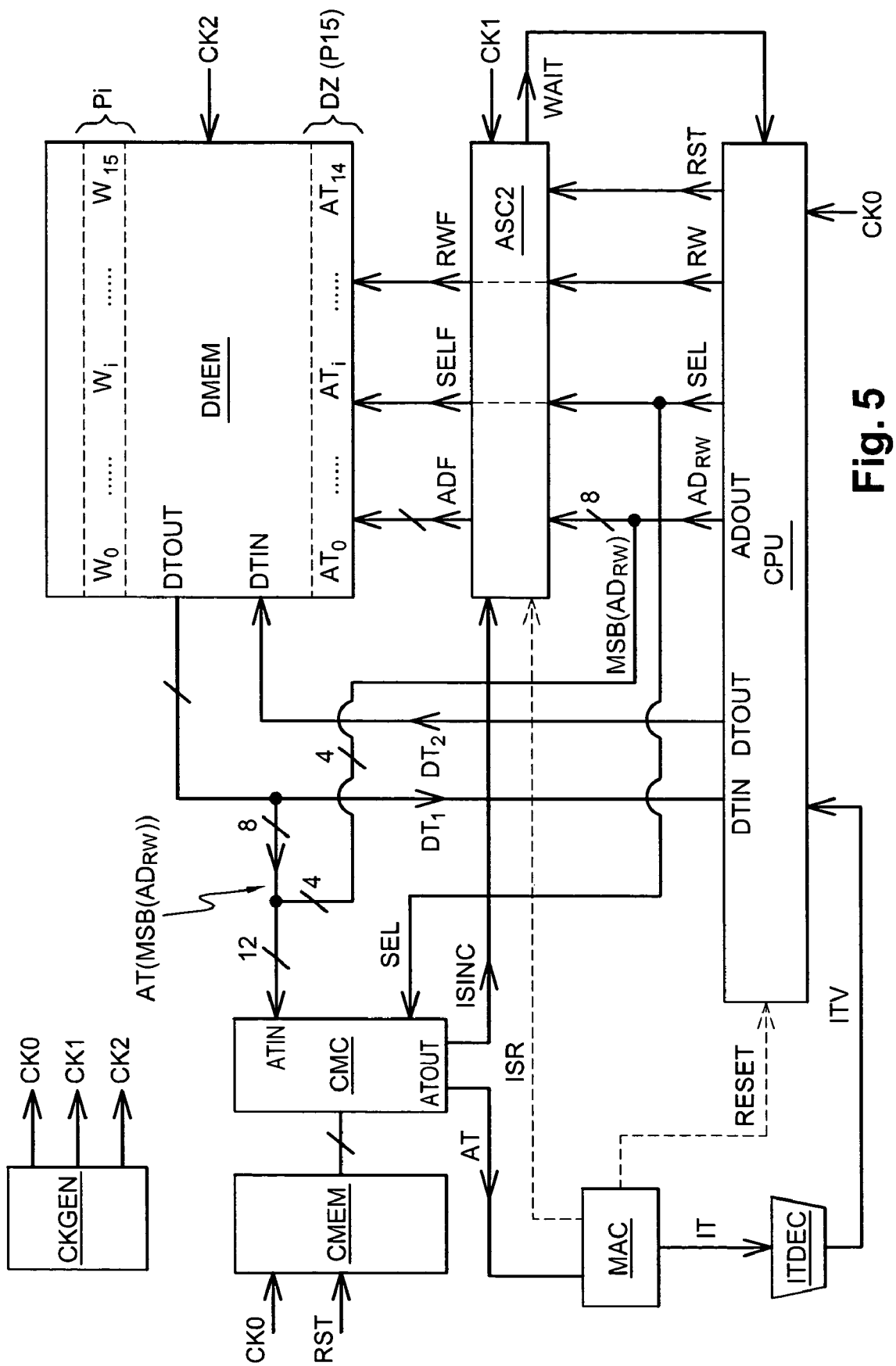
FIG. 5 represents a second embodiment of an access control device according to the present invention.

FIG. 5 represents a second embodiment of the access control device according to the present invention, implemented within the same elements. The CPU, the memory DMEM, the interrupt decoder ITDEC and the circuit CKGEN supplying the clock signals CK0, CK1, CK2 are found again. It is considered here that the memory DMEM has the structure described in relation with FIG. 4, and that it thus comprises data of 8 bits (words W0-W15 or attributes AT0-AT14) and is addressed in 8 bits (address-ADrw).

As above, the access control device comprises the circuit MAC and a synchronous attribute search circuit, here designated ASC2, which is inserted between the CPU and the memory in the manner already described for the circuit ASC1 (Cf. Table 1).

The access-control device further comprises a cache memory comprising a memory array CMEM and a circuit CMC for managing the cache memory.

The memory array CMEM of the cache memory is formed by logic latches, such as D latches for example, the update of which is clocked by the rising edges of the signal CK0. An example of structure of this memory array will be described below in greater detail.

Figure 6:
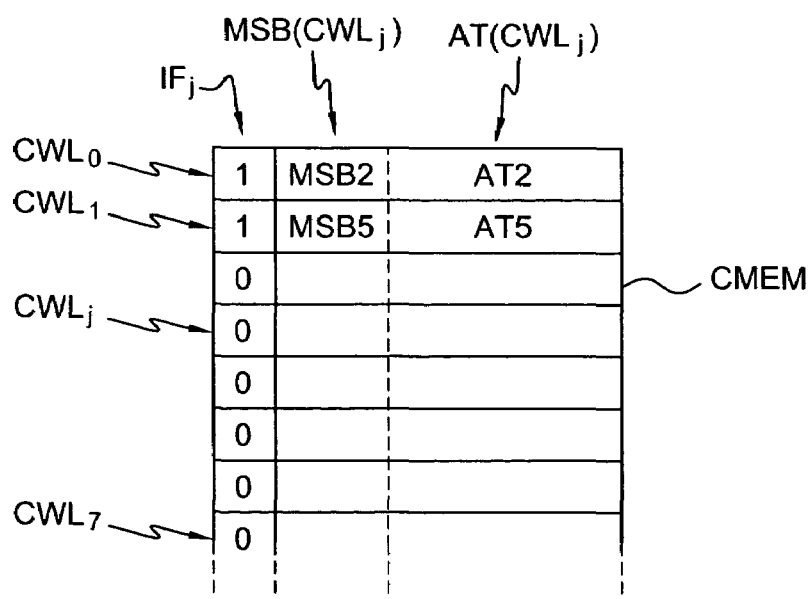
FIG. 6 represents the internal organization of a cache memory according to the present invention, present in the device in FIG. 5.

FIG. 6 represents an example of internal organization of the memory array CMEM. The latter comprises for example 8 word lines CWL0, CWL1, . . . CWLj, . . . CWL7 of 13 bits each. Each word line CWLj can receive an attribute AT(CWLj) (8 bits), the address MSB(CWLj) of the memory page with which the attribute is associated (4 bits), and an indicator flag IFj (1 bit) indicating whether or not the word line is used. On the example represented, the memory array is not full and only comprises two attributes AT2, AT5 respectively corresponding to the pages P2, P5 of the data memory, as well as the addresses MSB2, MSB5 of the memory pages with which these attributes are associated. As the cache memory is managed like a stack, as will be described below, the word lines receiving these two attributes are those that are at the top of the memory array CMEM, i.e. the word lines CWL0, CWL1 (the line CWL0 forming the top of the stack). The indicator flags IFj of these word lines are on 1 (lines used) while the flags of the other word lines are on 0.

As represented in FIG. 5, the circuit CMC for managing the cache memory comprises a 12-bit data input ATIN that is connected both to the output DTOUT of the memory DMEM for receiving an attribute AT(MSB(ADrw)), and to 4 wires of the output ADOUT of the CPU for receiving the most significant bits MSB(ADrw) of the address ADrw. The circuit CMC also comprises an 8-bit output ATOUT supplying an attribute to the circuit MAC, and an output supplying a signal ISINC ("Is In Cache") to the circuit ASC2. This signal is by default on 0 and changes to 1 when an attribute is found in the cache memory.

The circuit CMC performs the following tasks:

when the signal SEL is on 1, asynchronously searching for an attribute in the cache memory, without address decoding, and, as necessary, reading this attribute and supplying it to the output ATOUT, and asynchronously updating the signal ISINC. ("1" if the attribute has been found, otherwise "0"), updating the cache memory, when the signal SEL is on 1 and upon the appearance of a rising edge of the signal CK0. Updating the cache memory comprises:

when the signal ISINC is on 0, saving at the top of the stack a new attribute AT(MSB(ADrw)) supplied by the data memory (attribute not found in the cache memory and read in the data memory by the circuit CMC), as well as saving the address MSB(ADrw) of the corresponding memory area, then shifting the attributes already in the stack to the bottom.

when the signal ISINC is on 1 (attribute found in the cache memory), moving the attribute read in the cache memory to the top of the stack, and shifting to the bottom of the stack attributes that are between the top of the stack and the original place of the attribute read in the cache memory.

Thus, the last attribute used, whether or not it has been found in the cache memory, always finds itself at the top of the stack, and the attributes that are ejected from the stack when a new attribute is saved are always the oldest attributes. The cache memory thus only comprises the last attributes used.

Figure 7:
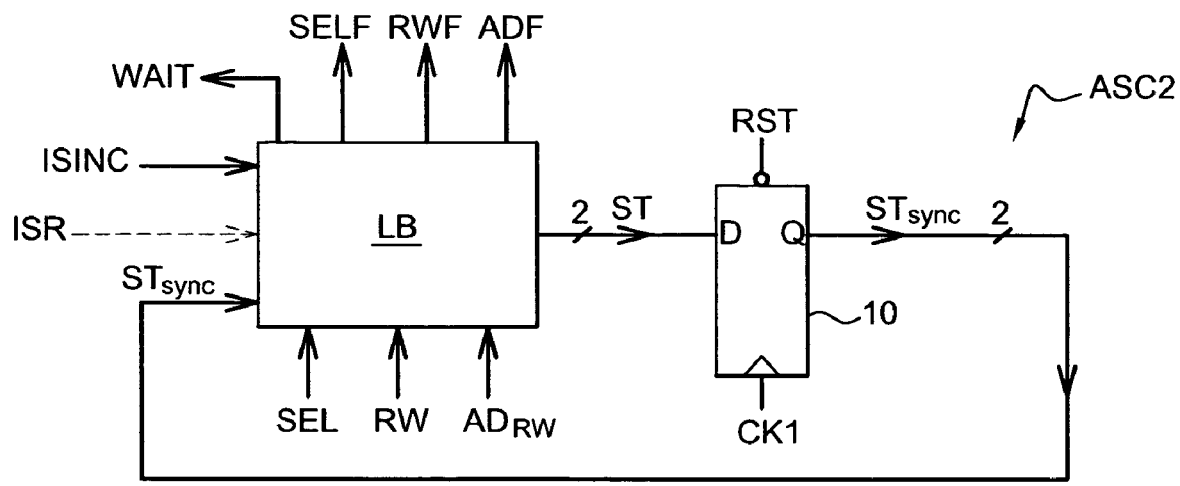
FIG. 7 is the block diagram of an attribute search circuit present in the device in FIG. 5.

The circuit ASC2 is a state machine an example of an embodiment of which is represented in FIG. 7. The circuit ADC2 comprises a logic block LB and a logic latch 10 driven by the signal CK1. The logic block performs the transitions from one state to the other and the latch 10 performs the synchronization of the state transitions with the signal CK1.

The logic block LB comprises an output coded on 2 bits supplying the internal state ST of the state machine, which is linked to a D input of the latch 10, the latter being for example formed by two D latches in parallel. The latch 10 receives the signal CK1 at a clock input, a signal RST supplied by the CPU at a reset input, and supplies at a Q output a synchronized state STsync that copies the state ST at each rising edge of the signal CK0 and which is sent back to an input of the logic block LB.

The logic block LB also comprises inputs receiving the access command signals SEL, RW, ADrw supplied by the CPU, an input receiving the signal ISINC supplied by the circuit CMC, and outputs supplying the filtered signals SELF, RWF, ADF and, the signal WAIT. Optionally and as represented in dotted lines, the logic block LB also comprises an input receiving an inhibiting signal ISR supplied by the circuit MAC.

Figure 8:
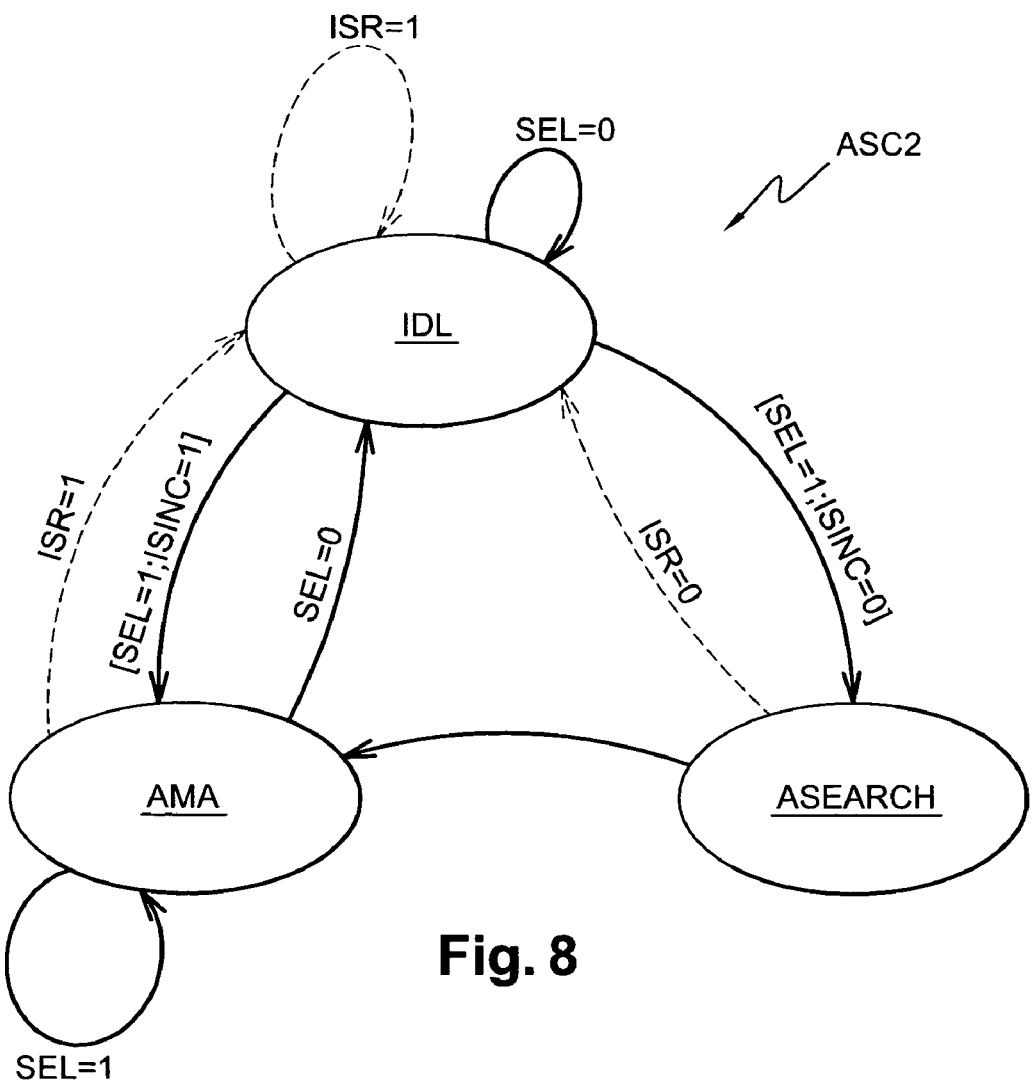
FIG. 8 is a state diagram showing the operation of the attribute search circuit.

FIG. 8 is a state diagram representing three internal states of the circuit ASC2. These states are identical to those of the circuit ASC1 and comprise the state IDL, the state ASEARCH, and the state AMA. The circuit ASC2 differs from the circuit ASC1 by the conditions of transition between these states, which here depend on the signal ISINC.

Thus, the circuit ASC2 remains in the state IDL while the signal SEL remains on 0. A transition from the state IDL to the state ASEARCH is provided when SEL=1 and ISINC=0. A transition from the state IDL to the state AMA is provided when SEL=1 and ISINC=1. An automatic transition from the state ASEARCH to the state AMA is provided, upon the appearance of a rising edge of the signal CK0. A transition from the state ASEARCH or from the state AMA to the state IDL is provided When SEL=0.

Optionally, a priority transition from the state ASEARCH to the state IDL can be provided when the signal ISR changes to 1. The signal ISR then forces the circuit ASC2 to come back to the state IDL, so as to prevent the writing or reading of a datum in the data memory. In this case, the forced maintaining in the state IDL is also provided when the signal ISR is on 1, to prevent the circuit ASC2 from switching into the state AMA when SEL=1 and ISINC=1.

Thus, the circuit ASC2 mainly differs from the circuit ASC1 by the fact that if the signal ISINC is on 1 when the edge of the signal CK1 occurs, the circuit ASC2 can switch directly from the state IDL to the state AMA in which it is transparent in relation to a command applied by the CPU. That means that the circuit CMC has found the attribute searched for in the memory array of the cache memory (ISINC=1) and that it is not necessary to switch into the state ASEARCH to search for the attribute. In this case, the command sent by the CPU is executed during the first clock cycle, instead of being executed during the next clock cycle.

The operation of the circuit ASC2 will be better understood with reference to the timing diagrams represented in FIGS. 9A to 9M, which show the execution of a command for reading the data memory, during which the attribute is not found in the cache memory and must be searched for in the data memory.

Figure 9:
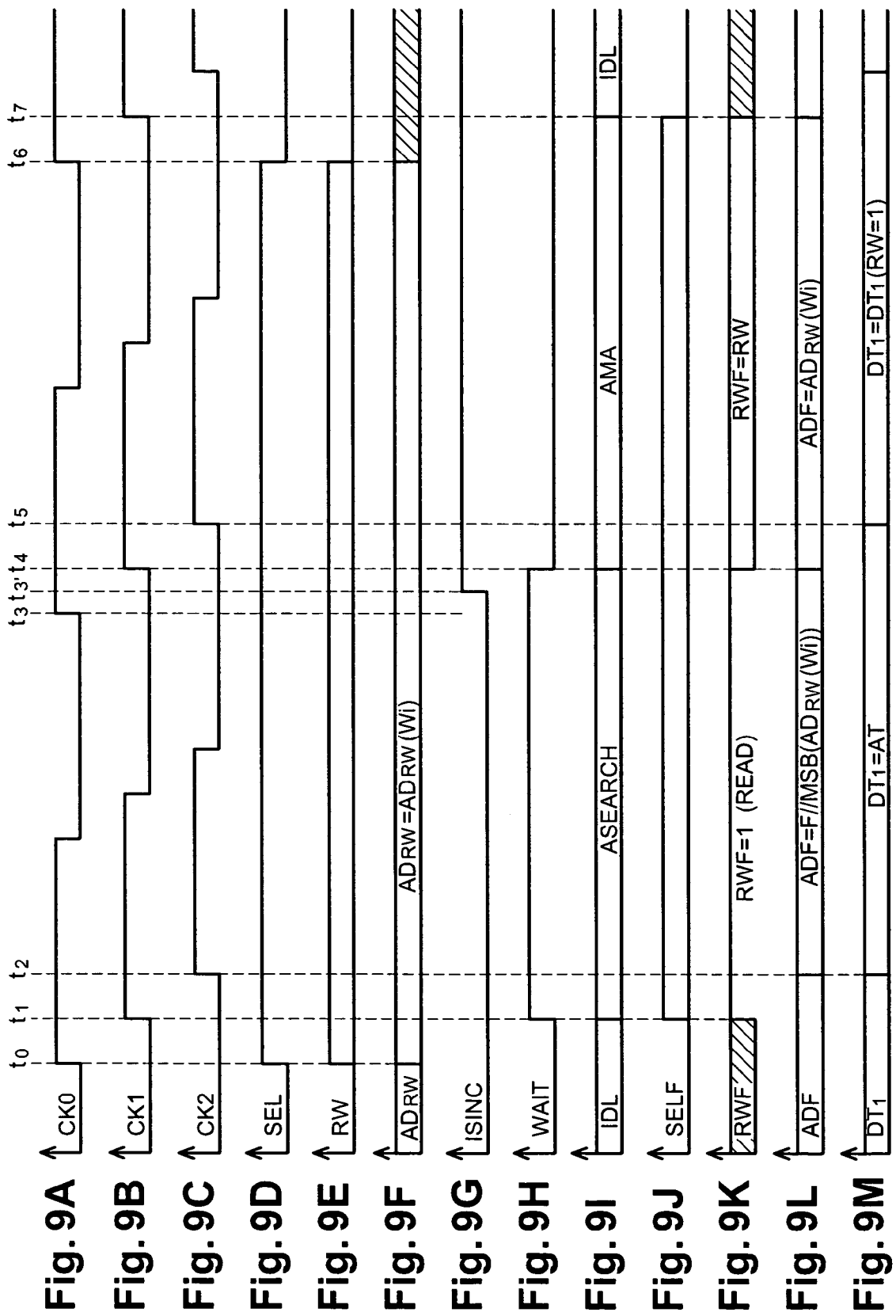
FIGS. 9A to 9M are timing diagrams of logic signals showing the operation of the device in FIG. 5.

FIGS. 9A, 9B, 9C respectively represent the signals CK0, CK1, CK2. FIG. 9D represents the signal SEL supplied by the CPU. FIG. 9E represents the signal RW supplied by the CPU. FIG. 9F represents the address ADrw supplied by the CPU. FIG. 9G represents the signal ISINC supplied by the circuit CMC. FIG. 9H represents the signal WAIT supplied by the circuit ASC2. FIG. 9I represents the internal state of the circuit ASC2. FIG. 9J represents the filtered selection signal SELF supplied by the circuit ASC2. FIG. 9K represents the filtered signal RWF supplied by the circuit ASC2. FIG. 9L represents the filtered address ADF supplied by the circuit ASC2. FIG. 9M represents data DT1 read in the memory DMEM.

First Clock Cycle

At an instant t0 corresponding to a rising edge of the signal CK0, the CPU sets the signals RW and SEL to 1 and supplies the address ADrw of a word Wi to be read in the memory DMEM. The change to 1 of the signal SEL activates the circuit CMC which then searches in the memory array CMEM for an attribute corresponding to the page containing the word Wi at which the address ADrw is aimed. For this purpose, the circuit CMC compares the address of pages MSB(CWLj) present in the word lines CWLj of the cache memory with the most significant bits MSB(ADrw) of the address ADrw. The signal ISINC here remains on 0 after the instant t0, which means that the result of the comparison is negative and that the attribute sought is not in the cache memory (the signal ISINC being on 0 by default).

At an instant t1 corresponding to a rising edge of the signal CK1, the circuit ASC2 switches into the state ASEARCH since the signal SEL is on 1 and the signal ISINC is on 0. The circuit ASC2 sets the signals WAIT, SELF, and RWF to 1, and supplies to the data memory an address ADF corresponding to the address of the attribute sought, i.e. ADF=F//MSB (ADrw).

At an instant t2 corresponding to a rising edge of the signal CK2, the data memory is activated then supplies a datum DT1 equal to the attribute sought, i.e. DT1=AT(MSB(ADrw)), after the access time Tacc (not represented in the Figures out of concern to remain simple) has elapsed.

Second Clock Cycle

At an instant t3 corresponding to a next rising edge of the signal CK0, the cache memory is automatically updated since the signal ISINC is on 0. The attribute AT(MSB(ADrw)) supplied by the data memory is supplied to the circuit MAC and is simultaneously saved at the top of the stack, with the address MSB(ADrw) of the corresponding memory area.

As the signal SEL is still on 1 after the update of the cache memory, the circuit CMC again searches in the memory array CMEM of the cache memory for an attribute corresponding to the address ADrw. This attribute is now found since it has just been saved in the cache memory, such that the signal ISINC changes to 1 at an instant t3' almost immediately following the instant t0, imposed by the asynchronous propagation time of the logic signals in the circuit CMC.

At an instant t4 corresponding to a next rising edge of the signal CK1, and assuming here that the circuit MAC has not set the inhibiting signal ISR to 1, the circuit ASC2 switches into the transparent state AMA. The address ADF copies the address ADrw of the word to be read, the signal SELF copies the signal SEL and remains on 1, the signal WAIT changes back to 0, the signal RWF copies the signal RW and thus here remains on 1 (read access requested by the CPU).

At an instant t5 corresponding to a next rising edge of the signal CK2, the data memory is activated then supplies, after the access time Tacc has elapsed, a datum DT1 equal to the word Wi the read access to which is requested by the CPU.

Third Clock Cycle

At an instant t6 corresponding to a next rising edge of the signal CK0, the CPU sets the signal SEL back to 0 and can process the word Wi. At an instant t7 corresponding to a next rising edge of the signal CK1, the circuit ASC2 returns to the state IDL.

At the instant t6, the CPU may however wish to access the data memory again. In this case, the CPU leaves the signal SEL on 1. The circuit ASC2 does not come back to the state IDL at the instant t7, but switches into the state ASEARCH or AMA (depending on whether or not the corresponding attribute is in the cache memory).

As indicated above, this embodiment of the present invention is here based on the fact that successive accesses to the data memory most often concern the same memory area, such that the attribute sought will, in most cases, be found in the cache memory. The sequence that has just been described will therefore rarely be triggered, except when the first commands are applied to the data memory, since the cache memory will be empty and must gradually fill up.

It goes without saying that providing a cache memory able to receive several attributes enables several successive sequences to access several memory areas to be covered. In practice, the size of the cache memory will be chosen according to the preferred compromise between the surface area occupied by the cache memory and the speed of execution of the access commands, the average speed of execution of an access command being in inverse proportion to the probability of finding the relevant attribute in the cache memory.

An example of an embodiment of the memory array CMEM and of the circuit CMC for managing the cache memory will now be described in greater detail.

Figure 10:
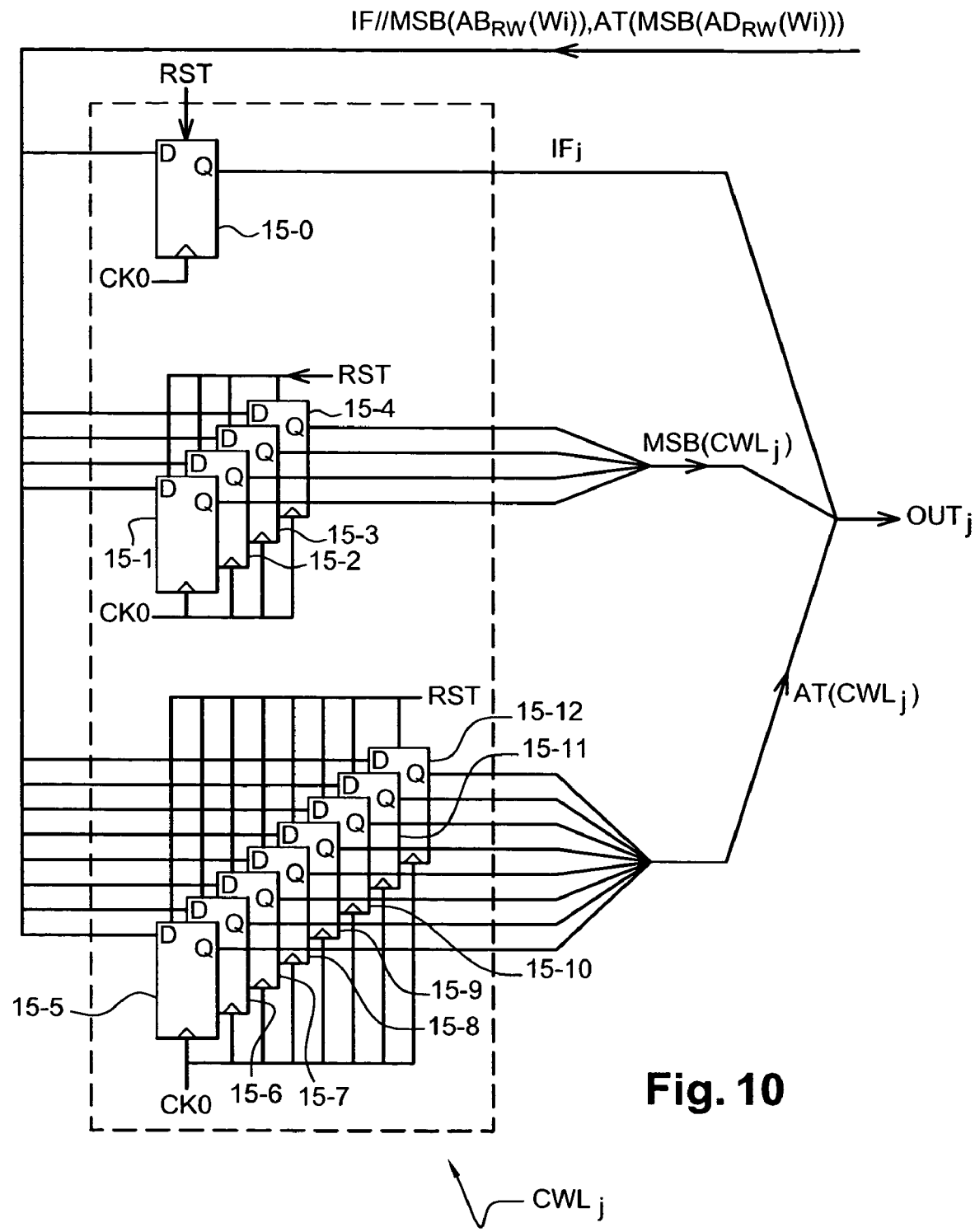
FIG. 10 represents the architecture of a word line of the cache memory according to one embodiment of the present invention.

FIG. 10 represents the structure of any word line CWLj of the memory array of the cache memory, in which an attribute AT(CWLj) is saved, as well as the 4 most significant address bits MSB(CWLj) of the memory page to which the attribute corresponds, and the indicator flag IFj.

The word line CWLj comprises 13 D-type latches 15-0 to 15-12, each receiving one bit. The latch 15-0 receives the indicator flag IFj, the latches 15-1 to 15-4 receive the 4 bits of the address MSB(CWLj), and the latches 15-5 to 15-12 receive the attribute AT(CWLj).

The word line CWLj has an input INj of 13 bits each wire of which is linked to a D input of one of the latches 15, and an output OUTj of 13 bits each wire of which is linked to a Q output of one of the latches 15. Each latch 15 receives the signal CK0 at a synchronization input, and copies at its Q output the bit present on its D input, when the signal CK0 has a rising edge. When a 13-bit word made up of the concatenated elements IFj, MSB(ADrw), and AT(MSB(ADrw)) is applied to the input INj of a word line CWLj, this word is saved by the word line upon the rising edge of the signal CK0. The elements forming the word saved in a word line CWLj are designated MSB(CWLj) and AT(CWLj) to distinguish them from the incoming elements MSB(ADrw) and AT(MSB(ADrw)).

Each latch 15 also receives at a reset input the signal RST supplied by the CPU. Thus, when the CPU sets this signal to 1, the content of the cache memory is emptied and the attribute search circuit ACS2 is also reset (FIG. 7).

Figure 11:
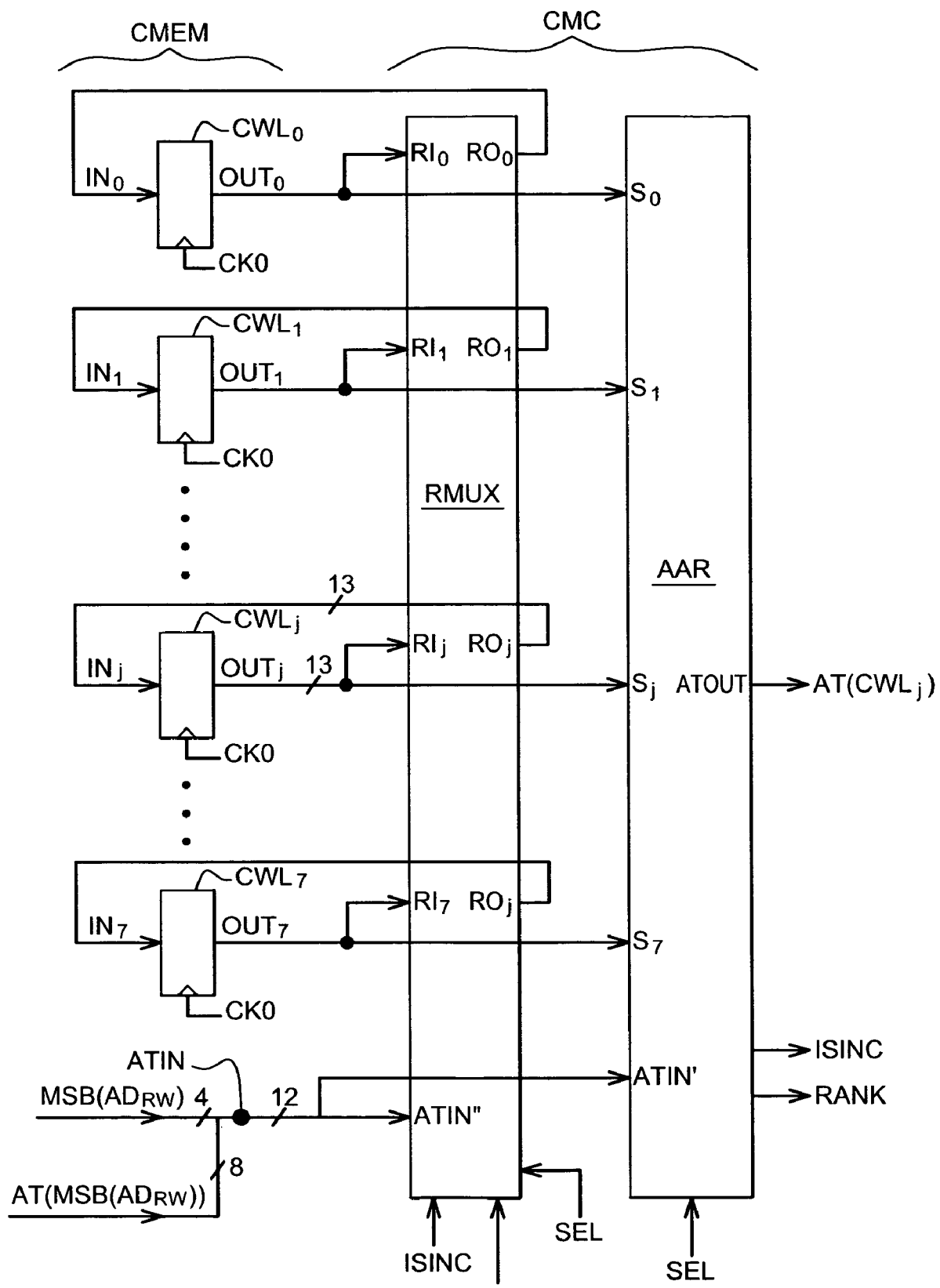
FIG. 11 is the block diagram of a circuit for managing the cache memory.

FIG. 11 represents the general architecture of the circuit CMC, the word lines CWLj (CWL0, CWL1, ... CWL7) of the cache memory being represented in block form each having an input INj (IN0 to IN7) and an output OUTj (OUT0 to OUT7).

The circuit CMC comprises an asynchronous circuit AAR for searching for attributes in the cache memory and a circuit RMUX for updating the cache memory.

The circuit AAR comprises inputs Sj (S0, S1, ... S7), an input receiving the signal SEL supplied by the CPU, and an input ATIN' linked to the input ATIN of the circuit CMC. The input ATIN of 14 bits, already described above, is connected to the data memory DMEM and to the output ADOUT of the CPU. It enables the circuit AAR to receive a new attribute AT(MSB(ADrw)) read in the dedicated area (page P15) of the data memory, and to receive the address MSB(ADrw) of the memory page with which this attribute is associated, formed by the 4 most significant bits of the address ADrw supplied by the CPU.

Each input Sj of the circuit AAR is connected to the output OUTj (OUT1, OUT1, ... OUT7) of the word line CWLj of the same rank in the cache memory. The circuit AAR also has an output supplying the signal ISINC already described, and a signal RANK indicating, when an attribute is found in the cache memory, the rank of the word line (here from 0 to 7) in which this attribute has been found.

The circuit AAR comprises an attribute detection circuit ADC an example of an embodiment of which is represented in FIG. 12.

This circuit ADC comprises a first series of comparators CMP0j (CMP00, CMP01, ... CMP07) for comparing the addresses MSB(CWLj) present in the word lines CWLj of the cache memory and the address MSB(ADrw) present at the input ATIN'. Each comparator CMP0j receives at an input the address MSB(CWLj) saved in the word line CWLj of corresponding rank, and the address MSB(ADrw) at another input. If one of the addresses present in the cache memory corresponds to the address of the secured memory area at which the access command is aimed, the output of the corresponding comparator changes to 1.

The circuit ADC also comprises a second series of comparators CMP1j (CMP10, CMP11, ... CMP17) for testing the indicator flags IFj (IF0, IF1 ... IF7), each comparator receiving a flag IFj at an input and the logic value 1 at another input. If one of the flags present in the cache memory is equal to 1, the output of the corresponding comparator changes to 1.

The outputs of the comparators M0j, M1j of the same rank are combined in an AND gate AGj (AG0, AG1 ... AG7), the output of which supplies a signal ISINj (ISIN0, ISIN1, ... ISIN7). This signal changes to 1 if the address present in the word line of the same rank corresponds to the address of the secured memory area at which the access command is aimed, and if the indicator flag IFj is on 1.

The different signals ISIN0, ISIN1, ... ISIN7 supplied by the logic gates AG0, AG1 ... AG7 are sent to the inputs of an OR gate 20 the output of which is applied to an input of a multiplexer 21 the output of which supplies the signal ISINC. The multiplexer 21 receives the logic value 0 at another input and is driven by the signal SEL. It selects the output of the gate 20 when the signal SEL=1.

The circuit AAR also comprises an attribute selection circuit ASELC, an example of an embodiment of which is represented in FIG. 13.

The circuit ASELC comprises a group of cascade-arranged multiplexers 25-j (25-0 to 25-7). Each multiplexer of rank j receives at a first input the output of the next multiplexer 25-(j+1), receives at a second input the attribute AT(CWLj) that is in the word line CWLj of the same rank in the cache memory, and receives at a command input the signal ISINj of the same rank j.

The last multiplexer, here the multiplexer 25-7, receives the logic value 0 at its first input. The first multiplexer 25-0 has its output connected to the input of a multiplexer 26 driven by the signal SEL and receiving at its other input the logic value 0.

When the signal SEL is on 1, the multiplexer 26 supplies the attribute selected by the group of multiplexers 25-j, chosen in a word line CWLj. The attribute is selected in the word line the rank of which is designated by the signal ISINj that is on 1 out of the signals ISIN0 to ISIN7. If an attribute sought is not in the cache memory, all the signals ISINj are on 0 and the output of the multiplexer 26 remains on 0 when the signal SEL changes to 1.

The circuit AAR also comprises a circuit RANKGEN an example of an embodiment of which is shown in FIG. 14. This circuit supplies the signal RANK that indicates the rank of the selected attribute, this signal being used by the circuit RMUX to determine the attribute that must be placed at the top of the stack. The circuit RANKGEN comprises a group of cascade-arranged multiplexers 30-j (30-0 to 30-7). Each multiplexer of rank j receives at a first input the output of the multiplexer of the next rank 30-(j+1), at a second input a binary number j equal to the rank of the multiplexer (i.e. here 0 to 7), and at a command input the signal ISINj of the same rank j.

The last multiplexer, here the multiplexer 30-7, receives a binary number equal to −1 at the first input. The first multiplexer 30-0 has its output connected to the input of a multiplexer 31 driven by the signal SEL, receiving a binary number equal to −1 at its other input.

When the signal SEL is on 1, the multiplexer 31 supplies the signal RANK. This signal is equal to the rank j of the signal ISINj that is on 1 out of the signals ISIN0 to ISIN7. If an attribute sought is not in the cache memory and all the signals ISIN0 to ISIN7 remain equal to 0, the signal RANK is equal to −1.

Now, by returning to FIG. 11, the circuit RMUX comprises inputs RIj (RI0 to RI7) and outputs ROj (RO0 to RO7). Each input RIj is connected to the output OUTj (OUT0 to OUT7) of the word line CWLj of the same rank in the cache memory. Each output ROj is connected to the input INj (IN0 to IN7) of the word line CWLj of the same rank in the cache memory. The circuit RMUX also comprises an input ATIN", an input receiving the signal RANK, an input receiving the signal ISINC and an input receiving the signal SEL. The input ATIN" is linked to the input ATIN of the circuit CMC, for receiving a new attribute AT(MSB(ADrw)) as well as the address MSB(ADrw) of the memory page with which this attribute is associated.

The circuit RMUX updates the cache memory according to the value of the signal ISINC. The cache memory is updated upon the refresh of the latches forming the word lines CWLj, when the signal CK0 has a rising edge, the circuit RMUX being limited to interconnecting the inputs and the outputs of the word lines CWLj in an appropriate manner.

The circuit RMUX is produced in hard-wired logic using an RTL code ("Register Transfer Level") provided for generating logic circuits. This code comprises for example the following update sequences:

Update Sequence No. 1:
  If SEL=1 and INSINC=0
  (1) RO0=ATIN"
  (2) IF0=1
  (3) For j ranging from 1 to 7
  (4) While IFj=1
  (5) ROj=RIj−1

The equality of the line (1) means that the output RO0 is linked to the input ATIN" for saving in the first word line CWL0 (top of the stack) the external attribute AT((MSB(ADrw)) and the address (MSB(ADrw)) of the memory page with which the attribute is associated. The equality of the line (2) means that the indicator flag of the line CWL0 is set to 1. The equality of the line (5) means that all the other word lines used (IFj=1) are shifted to the bottom, each output of rank j being connected to the corresponding input of rank j−1.

Update Sequence No. 2
  If SEL=1, INSINC=1, RANK>0 (i.e. RANK≠−1 and RANK≠0):
  (1) For j=RANK
  (2) RO0=RIj
  (3) For j ranging from 0 to RANK−1
  (4) R0j+1=RIj The equality of the line (2) means that the attribute found in a word line of rank j is put back to the top of the stack, in the word line CWL0, by connecting the output RO0 to the input RIj of rank j=RANK. The equality of the line (4) means that all the word lines that are between the top of the stack and the word line at which the attribute has been found are shifted to the bottom.

FIGS. 15A, 15B, 16A, 16B, 17A and 17B show examples of updating the cache memory by the circuit RMUX.

Example 1 of Updating, Cache Memory Partially Full

FIG. 15A represents the content of the cache memory upon the appearance of a rising edge of the signal CK0, at the moment at which an attribute AT3, corresponding to a secured page of address MSB3, is searched for in the cache memory. The address MSB3 is not found in the cache memory and the signal ISINC remains on 0.

FIG. 15B represents the content of the cache memory upon the appearance of the next rising edge of the signal CK0, after the circuit ASC2 has read the attribute AT3 in the data memory, at the address F//MSB3. The attribute AT3 is saved in the first word line CWL0 with the secured page address MSB3. The other attributes present in the cache memory are shifted to the bottom.

Example 2 of Updating, Cache Memory Full

FIG. 16A represents the content of the cache memory upon the appearance of a rising edge of the signal CK0, at the moment at which the attribute AT3, corresponding to a secured page of address MSB3, is again searched for in the cache memory. The address MSB3 is found in the word line CWL4 of the cache memory (RANK=4) and the attribute AT3 is supplied to the circuit MAC by the circuit for managing the cache memory. The signal ISINC therefore changes to 1.

FIG. 16B represents the content of the cache memory upon the appearance of the next rising edge of the signal CK0. As the signal ISINC is on 1, the cache memory is reorganized. The attribute AT3 is saved in the first word line CWL0 with the corresponding secured page address MSB3. The attributes present in the word lines CWL0 to CWL3 (j ranging from 1 to RANK-1) are shifted to the lines of immediately lower rank.

Example 3 of Updating, Cache Memory Full

FIG. 17A represents the content of the cache memory upon the appearance of a rising edge of the signal CK0, at the moment at which an attribute AT8, corresponding to a secured page of address MSB8, is searched for in the cache memory. The address MSB8 is not found in the cache memory and the signal ISINC remains on 0.

FIG. 17B represents the content of the cache memory upon the appearance of the next rising edge of the signal CK0, after the circuit ASC2 has read the attribute AT8 in the data memory, at the address F//MSB8. The attribute AT8 is saved in the first word line CWL0 with the secured page address MSB8. The other attributes present in the cache memory are shifted to the lines of immediately lower rank. The attribute AT0 that was in the last word line of the cache memory before the update (FIG. 17A) is ejected and is replaced by the one that was in the penultimate word line CWL6.

When all is said and done, the cache memory is-here an ordered cache memory, due to the fact that it does not contain all the attributes available in the data memory, which enables the oldest attributes (in terms of the date of last use and not the date of storage in the cache memory) to be ejected.

The time for searching for an attribute in the cache memory is short and is only determined by the propagation time of the logic signals in the circuit ADC, for setting one of the signals ISINj to 1, and the propagation time of the logic signals in the circuit ASELC, for selecting the attribute designated by the signal ISINj that is on 1. These operations of searching by comparing values and of reading by selecting an attribute, do not therefore involve any address decoder or any sense amplifier, and consume very little current (the current consumed by switches of logic gates being very low).

Furthermore, the surface area of silicon occupied by the circuit CMC is clearly lower than the one occupied by the decoders and sense amplifiers of an attribute memory having a memory array of EEPROM, FLASH, ROM type, etc.

Thus, providing a cache memory is not a handicap that would remove the advantage resulting from removing the attribute memory and from arranging the attributes in a dedicated area of the data memory.

Moreover, if priority is to be given to the encumbrance of the device rather than to the speed of execution of the access commands, the cache memory can be reduced to a single word line.

Third Embodiment of an Access Control Device According to the Present Invention

A cache memory according to the present invention can also be implemented in an access control device using an attribute memory distinct from the data memory. The point of the cache memory is therefore to reduce the peak power consumption occurring during the reading of attributes in the attribute memory.

Figure 18:
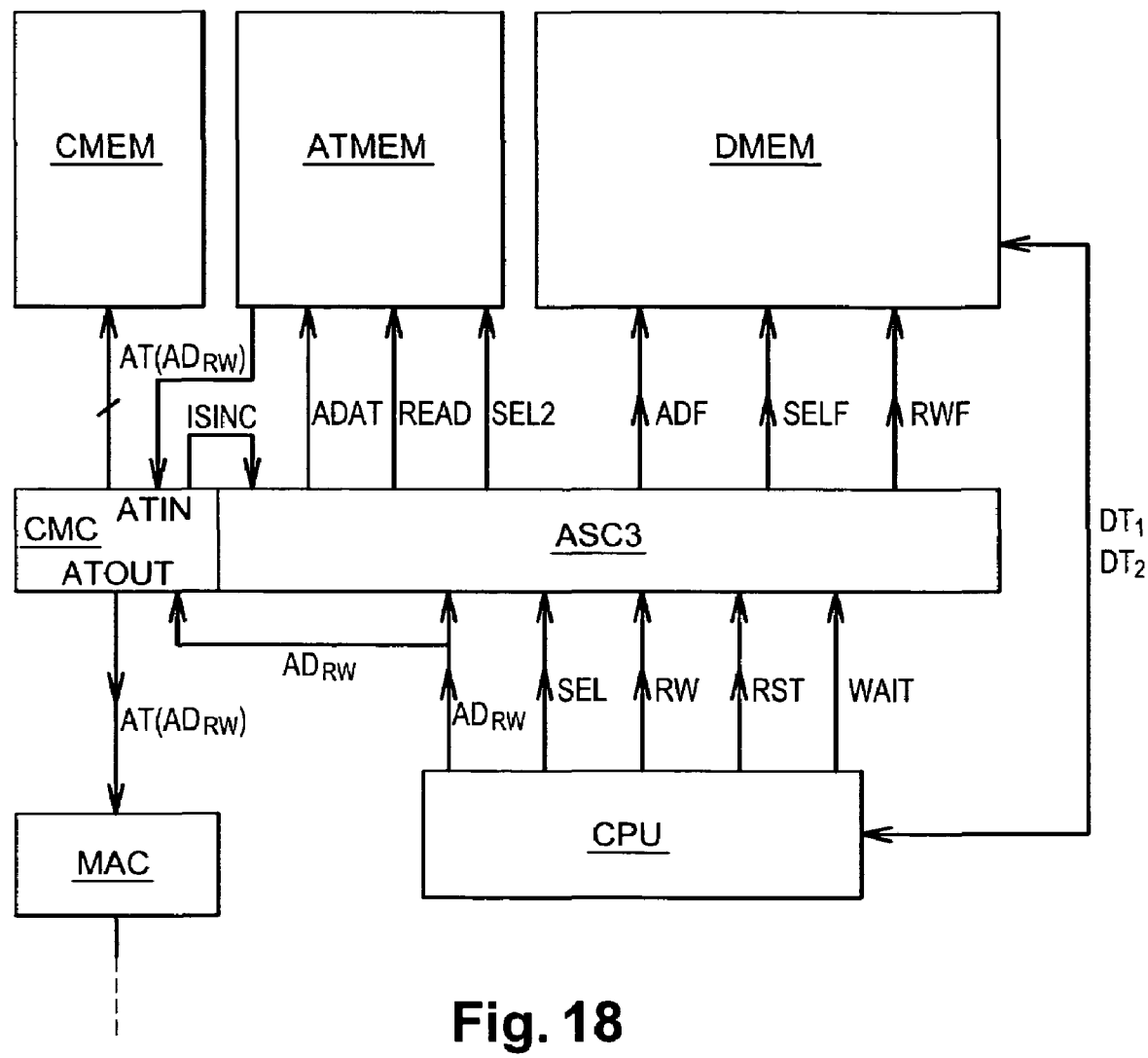
FIG. 18 represents a third embodiment of an access control device according to the present invention.

FIG. 18 shows such an embodiment. The elements already described are found again, i.e. the data memory DMEM, the CPU, the circuit MAC, and the cache memory comprising the memory array CMEM and the management circuit CMC. A synchronous attribute search circuit according to the present invention, here designated ASC3, is also found again.

Here, the attributes are stored in an attribute memory ATMEM. Thus, when an attribute sought is not found in the cache memory, the circuit ACS3 searches for the attribute in the memory ATMEM instead of searching for it in the memory DMEM. For that purpose, the circuit ASC3 supplies to the memory ATMEM a selection signal SEL2, a read signal READ and an attribute address ADAT that is calculated using the address ADrw supplied by the CPU. During the reading of the attribute in the memory ATMEM, the filtered signals ADF, SELF, RWF supplied by the circuit ASC3 to the memory DMEM are maintained at their default value.

Other Alternatives of the Present Invention

Other alternatives and embodiments of the present invention may be made.

The essential signals involved in access control were described above. However, and as indicated in the preamble, other information can be taken into account by the circuit MAC to determine the access authorizations, for example the operating mode of the CPU ("user" mode, "operating system" mode, "test" mode, etc.). This information is communicated to the circuit MAC in the shape of signals sent by the CPU or in the shape of internal flags of the CPU accessible to the circuit MAC.

Furthermore, although, out of concern to be clear, the attribute search circuit and the circuit for managing the cache memory were described as distinct circuits, these circuits can be merged into a single circuit for managing the attributes which integrates the capabilities of these two circuits, it being possible to integrate the capabilities of the circuit MAC too.

The secured memory areas, instead of being pages of the data memory, can be sectors comprising a plurality of pages, or conversely portions of pages. The conversion of a secured memory area address into an attribute address can be more complex than the one described above, and use a conversion table drawing the link between the address supplied by the CPU and the address of the corresponding attribute.

Finally, the access commands sent to the data memory are not necessarily sent by a microprocessor central processing unit. They may be commands delivered by any type of element, particularly a hard-wired logic sequencer, or external commands received by input/output terminals of the integrated circuit.

Three embodiments of an access control device according to the present invention were described above. The first embodiment comprises attributes stored in the data memory and a synchronous circuit for searching for attributes in the data memory. The second embodiment comprises a cache memory according to the present invention, an asynchronous circuit for searching for attributes in the cache memory, attributes stored in the data memory and a synchronous circuit for searching for attributes in the data memory. The third embodiment comprises a cache memory according to the present invention, an asynchronous circuit for searching for attributes in the cache memory, an attribute memory distinct from the data memory and a synchronous circuit for searching for attributes in the attribute memory.

The optimization of this third embodiment in terms of encumbrance is lower since the surface area of silicon occupied by the cache memory is not offset by the removal of the attribute memory. This embodiment can however be advantageous with large data memories open to a high number of users and comprising a substantial number of secured memory areas (such as multi-application memories for example). In this case, in response to an access request sent by a determined user, an attribute can be searched for in the cache memory while the memory is being accessed by another user. The advantage of the cache memory is therefore a reduction in the current consumed to read the attributes, a reduction that can be considerable when the memory is constantly subjected to access commands.

Finally, other alternatives and applications of a cache memory according to the present invention may be made.

Concerning the alternatives, within the scope of the present invention, a cache memory can be provided that can contain all the attributes and which updates itself as and when memory accesses require attributes to be read in the data memory (or in the attribute memory), or a cache memory can be provided that can contain all the attributes and which is updated when the integrated circuit is switched on.

Such a cache memory has advantages in terms of power consumption and reading speed. Furthermore, if the cache memory contains all the attributes, it is not necessary to reorganize it cyclically as described above, by placing the last attribute used at the top of the cache memory, since no attribute is ejected from the cache memory during and after the updating phase.

Concerning the applications, the very principle of asynchronously reading the cache memory by searching for an address corresponding to the attribute can be used in applications other than the one described above. Generally speaking, a cache memory according to most embodiments of the present invention contains source data (attributes in the above-described application) and tags attached to the source data (addresses of secured areas in the above-described application). The search for a source datum in the cache memory comprises the fact of comparing the tags with a reference tag attached to the source datum sought, and extracting from the memory the source datum whose tag corresponds to the reference tag.

As it results from the above, the term "synchronous attribute search circuit" is used in the present application and in the claims to designate an attribute search circuit the internal operation of which is clocked by a clock signal (here a state machine clocked by the signal CK1), while the term "asynchronous attribute search circuit" is used to designate an attribute search circuit the internal operation of which is not clocked by a clock signal, the supply of the result only depending on the propagation time of the electric or logic signals in the constituent elements of the asynchronous circuit.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A high-speed read cache memory, comprising:
 a memory array comprising word lines each including a plurality of memory latches structured to save a datum comprising a source datum and a tag associated with the source datum; and
 a cache managing circuit for managing the cache memory, comprising a hard-wired logic asynchronous circuit for reading the memory array, without address decoder, the asynchronous circuit having no clock and being arranged for receiving a reference tag at input, for simultaneously comparing all the tags present in the memory array relative to the reference tag and then, if a tag is identical to the reference tag, asynchronously selecting the source datum associated with the identical tag and asynchronously supplying the source datum to an output of the cache managing circuit, wherein "asynchronously" means "without being clocked", wherein the asynchronous circuit includes:
 a plurality of hard-wired comparators corresponding respectively with the memory latches of the memory array, each hard-wired comparator being structured to simultaneously compare the reference tag with the tag saved in the corresponding memory latch and output a match signal if the reference tag matches the tag saved in the corresponding memory latch, and
 a plurality of selectors corresponding respectively with the hard-wired comparators, each selector being structured to, if the match signal is received, select and output the source datum associated with the matching tag.

2. A cache memory according to claim 1 wherein the cache managing circuit for managing the cache memory comprises a circuit for updating the memory array arranged for managing the memory array as a stack by saving data in the memory array according to a determined order, so as to eject the oldest data from the memory array, an old datum being a datum read in the memory array prior to a more recent datum, a more recent datum being a datum read more recently than an older datum.

3. A cache memory according to claim 2 wherein the circuit for updating the cache memory is arranged for saving a new datum at the top of the stack while shifting the data already present in the cache memory to the bottom of the stack and, if the stack is full, ejecting from the stack the datum that is at the bottom of the stack.

4. A cache memory according to claim 3 wherein the circuit for updating the cache memory is also arranged for placing a datum read in the cache memory at the top of the stack, and shifting the data already present in the cache memory to the bottom of the stack, and, if the stack is full, ejecting from the stack the datum that is at the bottom of the stack.

5. A cache memory according to claim 1, comprising connection means for electrically connecting the cache memory to a memory for storing a plurality of attributes associated respectively with a plurality of corresponding secured memory areas of a data memory, each attribute defining an authorization to access the corresponding secured memory area, the connection means being arranged so that the cache memory saves the attributes as the source data, and secured memory area addresses of the corresponding secured memory areas associated with the attributes as the tags associated with the source data.

6. A cache memory according to claim 1 wherein the memory array comprises logic latches receiving a periodic refresh signal.

7. A device for controlling access to a data memory that includes secured memory areas, the memory receiving read or read/write-access commands, the device comprising:

storage means for storing a plurality of attributes corresponding respectively with the secured memory areas of the data memory, each attribute defining an authorization to access the corresponding secured memory area;

a cache memory for saving a number of the attributes stored in the storage means, the cache memory including:

a memory array comprising word lines each provided for saving corresponding one of the attributes being saved in the cache memory and a secured memory area address of the secured memory area corresponding to the one of the attributes; and a cache management circuit for managing the cache memory comprising a hard-wired asynchronous circuit for searching the attributes in the cache memory without address decoding, the asynchronous circuit having no clock input and being arranged for, in response to receiving an access command aimed at one of the second memory areas of the data memory, searching the secured memory area addresses in the cache memory for a matching secured memory area address corresponding to the secured memory area at which the access command is aimed, and supplying the attribute corresponding to the matching secured memory area address; and a synchronous attribute search circuit, for searching in the storage means for an attribute corresponding to the secured memory are at which the access command is aimed, if the attribute is not in the cache memory.

8. A device according to claim 7 wherein the circuit for managing the cache memory is arranged for saving in the cache memory an attribute read in the storage means by the synchronous attribute search circuit.

9. A device according to claim 7 wherein the asynchronous attribute search circuit comprises a plurality of comparators for simultaneously comparing the secured memory area addresses saved in the cache memory with the address of the secured memory area at which the access command sent to the data memory is aimed.

10. A device according to claim 7 wherein the memory array of the cache memory comprises a plurality of logic latches forming memory cells of the cache memory.

11. A device according to claim 7 wherein the number of attributes saved in the cache memory is lower than the number of attributes saved in the storage means, and the cache management circuit comprises an update circuit structured to update the cache memory, and to manage the cache memory like a stack by putting the last attribute read in the cache memory to the top of the stack and by shifting attributes present in the stack to the bottom of the stack.

12. A device according to claim 11 wherein the update circuit is arranged for saving, at the top of the stack, a new attribute read in the storage means by the synchronous attribute search circuit, and shifting the other attributes present in the stack to the bottom.

13. A device according to claim 7 wherein the storage means are formed by a dedicated area of the data memory, and the synchronous attribute search circuit is arranged for, when an access command is sent to the data memory:

intercepting the access command if the attribute corresponding to the secured memory area at which the access command is aimed is not in the cache memory;

reading in the dedicated area of the data memory the attribute corresponding to the secured memory area at which the intercepted access command is aimed; and then applying the access command to the data memory.

14. A device according to claim 13 wherein the access command comprises at least one access signal and one access address, and wherein the synchronous attribute search circuit is arranged for, when the attribute corresponding to the secured memory area at which the access command is aimed is not in the cache memory:

preventing the application of the access signal and the access address to the data memory; and applying to the data memory a read-access signal and an access address corresponding to the area dedicated to the attributes, such that the data memory supplies the attribute corresponding to the secured memory area at which the access command is aimed.

15. A device according to claim 13 wherein the synchronous attribute search circuit, the cache management circuit and the data memory are synchronized by staggered clock signals.

16. A device according to claim 13 wherein the synchronous attribute search circuit is arranged for sending a wait signal to a unit sending the access command, while an attribute is being searched for in the data memory.

17. A device according to claim 16 wherein the sending unit is a microprocessor central processing unit, which is programmed to maintain an access command while the wait signal is present.

18. A device according to claim 7, comprising a control circuit for supplying a signal for authorizing or refusing access to the data memory, according to the value of the attribute and to the nature of the access command sent to the data memory.

19. A method, comprising:

controlling access to a data memory having secured memory areas and receiving read or read/write-access commands, by using a plurality of attributes saved in means for storing attributes, the attributes corresponding respectively with the secured memory areas of the data memory, each attribute defining an authorization to access the corresponding secured memory area providing a cache memory for saving a subset of the attributes saved in the storage means; and saving in the cache memory the attributes of the subset and, for each attribute of the subset, saving a secured memory area address of the secured memory area corresponding to the attribute;

searching for an attribute when an access command is sent to the data memory, wherein the attribute search step comprises:

an asynchronous step of searching the secured memory area addresses in the cache memory for matched secured memory area address corresponding to the secured memory area at which the access command is aimed, without using any address decoder, and of supplying the attribute corresponding to the matching secured memory area address, the asynchronous step being performed without being clocked; and a synchronous step of searching in the storage means for the attribute corresponding to the secured memory area at which the access command is aimed, if the attribute is not in the cache memory, the synchronous step being clocked.

20. The method according to claim 19, comprising saving in the cache memory an attribute not found in the cache memory and read in the storage means.

21. The method according to claim 19 wherein the asynchronous step of searching for the attribute in the cache memory comprises a plurality of simultaneous comparisons between the secured memory area addresses saved in the cache memory, and the address of the secured memory area at which the access command is aimed.

22. The method according to claim 19, comprising updating the cache memory and managing the cache memory like a stack by putting the last attribute read in the cache memory to the top of the stack, and by shifting attributes present in the stack to the bottom of the stack.

23. The method according to claim 22 wherein the step of updating the cache memory comprises a step of saving a new attribute read in the storage means at the top of the stack, by shifting the other attributes present in the stack to the bottom of the stack.

24. The method according to claim 19 wherein the storage means are formed by a dedicated area of the data memory, and the synchronous attribute search step comprises the steps of:
   intercepting the access command if the attribute corresponding to the secured memory area at which the access command is aimed is not in the cache memory;
   reading in the dedicated area of the data memory the attribute corresponding to the secured memory area at which the intercepted access command is aimed; and then
   applying the access command to the data memory.

25. The method according to claim 24 wherein an access command comprises at least one access signal and one access address, and the synchronous attribute search step comprises the steps of:
   preventing the application of the access signal and the access address to the data memory; and
   applying to the data memory a read-access signal and an access address corresponding to the area dedicated to the attributes, such that the data memory supplies the attribute corresponding to the secured memory area at which the access command is aimed.

26. The method according to claim 24, comprising the following steps, performed in synchronization with three staggered clock signals:
   upon the appearance of a variation edge of a first clock signal, searching for an attribute in the cache memory, then;
   if the attribute is found in the cache memory, applying the access command to the data memory upon the appearance of a variation edge of a second clock signal; and
   if the attribute is not found in the cache memory:
      applying a read address and a read signal to the data memory upon the appearance of the variation edge of the second clock signal; then,
      upon the appearance of a variation edge of a third clock signal, reading the attribute in the cache memory; then,
      upon the appearance of the next variation edge of the first clock signal, saving the attribute in the cache memory; and then,
      upon the appearance of the next variation edge of the second clock signal, applying the access command to the data memory.

27. The method according to claim 19, comprising sending a wait signal to a unit sending the access command, while an attribute is being searched for in the data memory.

28. The method according to claim 27 wherein the sending unit is a microprocessor central processing unit, which is programmed to maintain an access command while the wait signal is present.

29. The method according to claim 19, comprising a control step for supplying a signal for authorizing or refusing access to the data memory, according to the value of the attribute and the nature of the access command sent to the data memory.

* * * * *

UNITED STATES PATENT AND TRADEMARK OFFICE
CERTIFICATE OF CORRECTION

PATENT NO. : 7,523,259 B2  Page 1 of 1
APPLICATION NO. : 10/926778
DATED : April 21, 2009
INVENTOR(S) : Pierre Pistoulet It is certified that error appears in the above-identified patent and that said Letters Patent is hereby corrected as shown below:

On the Title Page, Item 75
"Puyricard (FR)" should read as --Thiais (FR)--.

Column 23
Line 12, claim 7, "saving corresponding" should read as --saving a corresponding--.

Line 23, claim 7, "one of the second" should read as --one of the secured--.

Line 32, claim 7, "secured memory are" should read as --secured memory area--.

Column 24
Line 45, claim 19, "secured memory area" should read as --secured memory area;--.

Line 56, claim 19, "in the cache memory for matched" should read as --in the cache memory for a matched--.

Column 25
Lines 31-32, claim 25, "wherein an access command" should read as --wherein the access command--.

Column 26
Line 20, claim 26, "appearance of the next" should read as --appearance of a next--.

Line 23, claim 26, "appearance of the next" should read as --appearance of a next--.

Signed and Sealed this

Sixth Day of April, 2010

David J. Kappos
*Director of the United States Patent and Trademark Office*